(12) United States Patent
Tamaru et al.

(10) Patent No.: US 11,356,615 B2
(45) Date of Patent: Jun. 7, 2022

(54) CAMERA DEVICE AND IR LIGHT IRRADIATING METHOD

(71) Applicant: Panasonic i-PRO Sensing Solutions Co., Ltd., Fukuoka (JP)

(72) Inventors: Tatsuya Tamaru, Fukuoka (JP); Satoshi Kataoka, Fukuoka (JP); Daisuke Hara, Fukuoka (JP); Hiroki Yamanaka, Fukuoka (JP)

(73) Assignee: PANASONIC I-PRO SENSING SOLUTIONS CO., LTD., Fukuoka (JP)

( * ) Notice: Subject to any disclaimer, the term of this patent is extended or adjusted under 35 U.S.C. 154(b) by 0 days.

(21) Appl. No.: 17/331,839

(22) Filed: May 27, 2021

(65) Prior Publication Data

US 2021/0289122 A1 Sep. 16, 2021

Related U.S. Application Data

(63) Continuation of application No. 16/745,832, filed on Jan. 17, 2020, now Pat. No. 11,070,740.

(30) Foreign Application Priority Data

Jan. 18, 2019 (JP) .............................. JP2019-007061
May 15, 2019 (JP) .............................. JP2019-092389

(51) Int. Cl.
*H04N 5/235* (2006.01)
*G02B 7/28* (2021.01)
(Continued)

(52) U.S. Cl.
CPC ........... *H04N 5/2354* (2013.01); *G02B 7/282* (2013.01); *H04N 5/2256* (2013.01); *H04N 5/23296* (2013.01)

(58) Field of Classification Search
CPC ......................... H04N 5/2354; H04N 5/23296
See application file for complete search history.

(56) References Cited

U.S. PATENT DOCUMENTS 5,439,621 A 8/1995 Hoopman
6,051,836 A 4/2000 Kirihata et al.
(Continued)

FOREIGN PATENT DOCUMENTS

JP 10-213478 A 8/1998
JP 2000-338557 A 12/2000
(Continued)

*Primary Examiner* — Christopher K Peterson
(74) *Attorney, Agent, or Firm* — Greenblum & Bernstein, P.L.C.

(57) ABSTRACT

A camera device includes a first IR illuminator that is configured to irradiate a first irradiation range in a capturing area with first IR light, a second IR illuminator that is configured to irradiate a second irradiation range narrower than the first irradiation range in the capturing area with second IR light, and a controller that is configured to obtain a zoom magnification of the lens and controls the irradiation of the first IR light and the second IR light in a case where the zoom magnification is equal to a predetermined zoom magnification. The controller changes a supplied current of the first IR illuminator for the irradiation of the first IR light over a first predetermined time period, and changes a supplied current of the second IR illuminator for the irradiation of the second IR light over a second predetermined time period.

6 Claims, 21 Drawing Sheets

(51) Int. Cl.
*H04N 5/225* (2006.01)
*H04N 5/232* (2006.01)
*G02B 13/14* (2006.01)

(56) References Cited

U.S. PATENT DOCUMENTS

| | | | |
|---|---|---|---|
| 9,681,056 B2* | 6/2017 | Nonaka | H04N 5/23296 |
| 11,025,839 B2 | 6/2021 | Tamaru et al. | |
| 2003/0011888 A1 | 1/2003 | Cox et al. | |
| 2005/0052751 A1 | 3/2005 | Liu et al. | |
| 2005/0265014 A1 | 12/2005 | Matsui et al. | |
| 2009/0161337 A1 | 6/2009 | Matsui | |
| 2012/0213503 A1 | 8/2012 | Gustaffson et al. | |
| 2013/0064531 A1* | 3/2013 | Pillman | H04N 5/2256 |
| | | | 396/62 |
| 2014/0183334 A1 | 7/2014 | Wang et al. | |
| 2014/0197314 A1 | 7/2014 | Afrooze et al. | |
| 2014/0340572 A1* | 11/2014 | Sato | H04N 5/225 |
| | | | 348/370 |
| 2015/0211708 A1 | 7/2015 | Stavely et al. | |
| 2015/0323152 A1 | 11/2015 | Mayer et al. | |
| 2015/0327347 A1 | 11/2015 | Afrooze et al. | |

FOREIGN PATENT DOCUMENTS

| | | |
|---|---|---|
| JP | 2001-245205 A | 9/2001 |
| JP | 2004-526300 A | 8/2004 |
| JP | 2005-338280 A | 12/2005 |
| JP | 2007-127768 A | 5/2007 |
| JP | 2012-173738 A | 9/2012 |
| JP | 2013-130631 A | 7/2013 |
| JP | 2014-132632 A | 7/2014 |
| JP | 2014-187663 A | 10/2014 |
| JP | 2014-530376 A | 11/2014 |
| JP | 2016-516313 A | 6/2016 |

* cited by examiner

CAMERA DEVICE AND IR LIGHT IRRADIATING METHOD

CROSS-REFERENCE TO RELATED APPLICATIONS

The present application is a continuation of U.S. patent application Ser. No. 16/745,832, filed Jan. 17, 2020, which claims the benefit of Japanese Patent Appl. Nos. 2019-092389, filed May 15, 2019, and 2019-007061, filed Jan. 18, 2019. The disclosure of each of the above-noted applications is expressly incorporated herein by reference in its entirety.

BACKGROUND OF THE INVENTION

1. Field of the Invention

The present disclosure relates to a camera device and an IR light irradiating method for performing irradiation of IR light that is infrared light.

2. Background Art

JP-T-2016-516313 discloses an IR beam generation method of specifying a focal length of a zoom lens, specifying a linear profile of an IR beam related to the current focal length using a beam profile-focal length map, and transmitting a control signal of an output ratio related to the specified linear profile to a current driver of each of a wide angle IR emitter and a narrow angle IR emitter. The IR beam is used for illuminating a capturing target scene.

However, in the configuration of JP-T-2016-516313, the output ratio of wide angle IR light and narrow angle IR light is changed depending on a zoom magnification. Thus, a problem arises in that it is difficult to perform control related to IR light irradiation. In addition, for example, in order to be capable of irradiating the capturing target scene with IR light in wide angle (WIDE), middle (MID), and narrow angle (TELE) irradiation ranges of three levels, a wide angle IR illumination, a middle IR illumination, and a narrow angle IR illumination may be prepared in a camera device such as a monitoring camera. In this case, during zoom-in or zoom-out, simply controlling the IR illumination to be used to switch ON and OFF causes a difference in brightness of IR light. The reason is that the brightness of IR light of irradiation from each IR illumination is different. A problem arises in that occurrence of a difference in brightness instantaneously degrades the image quality of a captured image and decreases visibility.

SUMMARY OF INVENTION

The present disclosure is conceived in view of the above matters in the related art. An object of the present disclosure is to provide a camera device and an IR light irradiating method for adaptively reducing degradation of the image quality of a captured image by simple control depending on a zoom process at the time of capturing a capturing target scene and improving the visibility of the captured image.

The present disclosure provides a camera device including a capturing unit that includes a lens on which light from a capturing area is incident and performs capturing based on the light transmitted through the lens from the capturing area, a first IR illuminator that is configured to irradiate a first irradiation range in the capturing area with first IR light, a second IR illuminator that is configured to irradiate a second irradiation range narrower than the first irradiation range in the capturing area with second IR light, and a controller that is configured to obtain a zoom magnification of the lens and controls the irradiation of the first IR light and the second IR light in a case where the zoom magnification is equal to a predetermined zoom magnification, in which the controller changes a supplied current of the first IR illuminator for the irradiation of the first IR light over a first predetermined time period, and changes a supplied current of the second IR illuminator for the irradiation of the second IR light over a second predetermined time period.

In addition, the present disclosure provides an IR light irradiating method implemented by a camera device including a lens. The method includes obtaining a zoom magnification of the lens, and controlling irradiation of first IR light having a first irradiation range and second IR light having a second irradiation range of a narrower angle than the first irradiation range in a case where the zoom magnification is equal to a predetermined zoom magnification. The first IR light and the second IR light are capable of being emitted toward a capturing area respectively from a first IR illuminator and a second IR illumination unit included in the camera device. The controlling of the irradiation includes changing a supplied current of the first IR illuminator for the irradiation of the first IR light over a first predetermined time period, and changing a supplied current of the second IR illumination unit for the irradiation of the second IR light over a second predetermined time period.

According to the present disclosure, it is possible to adaptively reduce degradation of the image quality of the captured image and improve the visibility of the captured image by simple control depending on the zoom process at the time of capturing the capturing target scene.

DETAILED DESCRIPTION OF THE EXEMPLARY EMBODIMENT

Hereinafter, embodiments specifically disclosing configurations and effects of a camera device and an IR light irradiating method according to the present disclosure will be described in detail with appropriate reference to the drawings. Unnecessarily detailed description may be omitted. For example, a detailed description of well-known matters and a duplicate description of substantially the same configurations may be omitted. By doing so, unnecessary redundancy of the following description is avoided, and the understanding of those skilled in the art is facilitated. The appended drawings and the following description are provided for those skilled in the art to sufficiently understand the present disclosure and are not intended to limit the subject matter disclosed in the claims.

BACKGROUND OF CONTENTS OF EMBODIMENT 1

Figure 3:
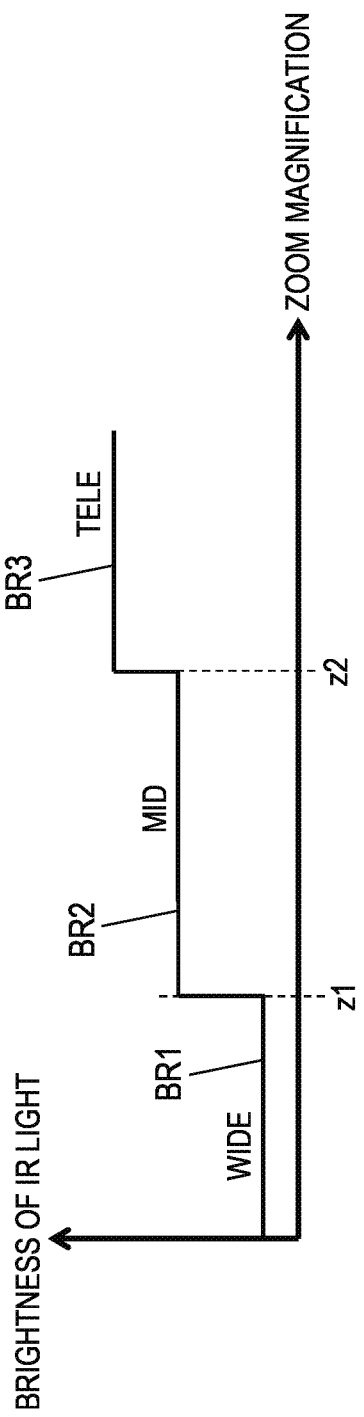
FIG. 3 is a diagram illustrating one example of brightness control of IR light corresponding to a zoom magnification according to a comparative example.

First, brightness control of IR light corresponding to a zoom magnification in the related art will be described as a comparative example forming an underlying technology of Embodiment 1 with reference to FIG. 3. FIG. 3 is a diagram illustrating one example of the brightness control of IR light corresponding to the zoom magnification according to the comparative example. In the graph illustrated in FIG. 3, a horizontal axis denotes the zoom magnification, and a vertical axis denotes the brightness of IR light of irradiation.

In the camera of the related art according to the comparative example, in a case where the zoom magnification is less than z1, irradiation is performed with only IR light having a wide angle (WIDE) irradiation range at a constant brightness BR1. In addition, in a case where the zoom magnification reaches z2 from z1, irradiation is performed with only IR light having a middle (MID) irradiation range at a constant brightness BR2. The brightness BR2 of the middle (MID) IR light is higher than the brightness BR1 of the wide angle (WIDE) IR light. Furthermore, in a case where the zoom magnification is greater than or equal to z2, irradiation is performed with only IR light having a narrow angle (TELE) irradiation range at a constant brightness BR3. The brightness BR3 of the narrow angle (TELE) IR light is higher than the brightness BR2 of the middle (MID) IR light.

When the zoom magnification reaches z1, simply switching the wide angle (WIDE) IR light irradiation OFF and switching the middle (MID) IR light irradiation ON causes a difference in brightness of IR light of irradiation. In other words, when the zoom magnification reaches z1, irradiation is instantaneously performed with strong IR light in a discrete manner. Similarly, when the zoom magnification reaches z2, simply switching the middle (MID) IR light irradiation OFF and switching the narrow angle (TELE) IR light irradiation ON causes a difference in brightness of IR light of irradiation. In other words, when the zoom magnification reaches z2, irradiation is performed with an instantaneous and discrete increase in intensity of IR light. While the above description is a description of zoom-in in which the zoom magnification is increased, the same applies to zoom-out in which conversely, the zoom magnification is decreased. That is, when the zoom magnification reaches z2, irradiation is performed with an instantaneous and discrete decrease in intensity of IR light. When the zoom magnification reaches z1, irradiation is performed with an instantaneous and discrete decrease in intensity of IR light. Thus, the image quality of the captured image is degraded at the moment of the instantaneous and discrete increase or decrease in intensity of IR light. A problem arises in that visibility is decreased.

Therefore, in the following embodiments, an example of a camera device and an IR light irradiating method for adaptively reducing degradation of the image quality of the captured image and improving the visibility of the captured image by simply control depending on a zoom process at the time of capturing a capturing target scene will be described.

Embodiment 1

Figure 1:
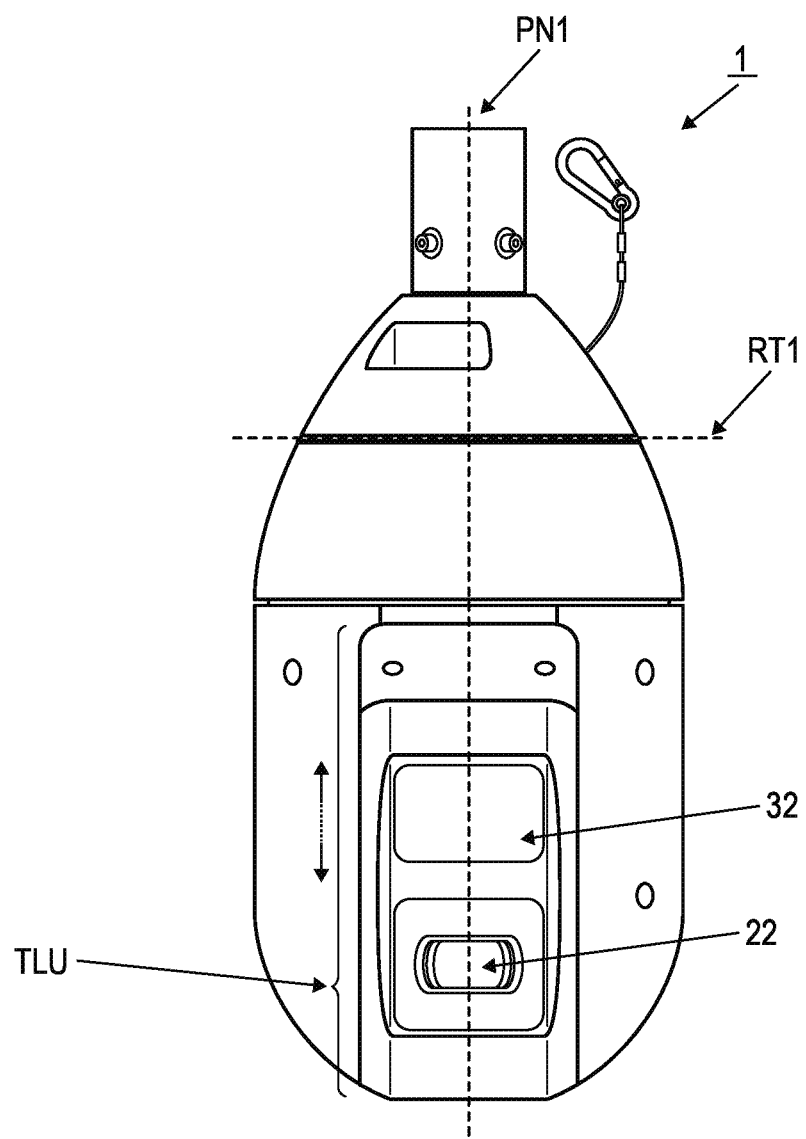
FIG. 1 is an exterior view of a camera

The exterior of a camera 1 and an internal configuration of the camera 1 according to Embodiment 1 will be described with reference to FIG. 1 and FIG. 2. FIG. 1 is an exterior view of the camera 1. In the present specification, upward, downward, leftward, and rightward directions of the camera 1 are denoted by arrows illustrated in FIG. 1. The direction of the front side of the page is the forward direction, and the direction of the rear side of the page is the rearward direction.

The camera 1 is a camera device that can be used in both indoor and outdoor locations. For example, the camera 1 is a monitoring camera or a conference camera. For example, the camera 1 is fixed and hung on the outer wall or the ceiling of a building and is used. Alternatively, the camera 1 is used such that the camera 1 can be converted to be arranged on a table by detaching and replacing a part of components (component connected to an attachment surface such as the outer wall and the ceiling) with another component. In addition, while a detailed internal configuration will be described below, the camera 1 has a configuration including a lens 22 as a capturing optical system and a plurality of IR-LEDs 32.

The camera 1 is a pan tilt zoom (PTZ) camera that can perform a tilt rotation and a zoom process. A capturing area can be changed by performing a pan rotation and the tilt rotation of the lens 22 and the IR-LEDs 32 (in other words, the optical axis direction of the lens 22 can be changed). Capturing can be omni-directionally performed. For example, in the camera 1, the pan rotation can be performed by turning the casing of the camera 1 on the lower side of a pan rotation surface RT1 leftward and rightward along a pan rotation axis PN1 that is parallel to the vertical direction. In other words, the casing of the camera 1 on the upper side of the pan rotation surface RT1 of the camera 1 is fixed on the flat attachment surface such as the ceiling and thus, is not turned. In addition, for example, in the camera 1, a tilt unit TLU that incorporates the lens 22 and the IR-LEDs 32 can be subjected to a 90 degree tilt rotation from the forward direction to the downward direction along a tilt rotation axis (not illustrated). The angle in which the tilt rotation of the tilt unit TLU can be performed is not limited to 90 degrees.

In the lens 22, light from the capturing area is incident and is imaged on an image sensor 24 through a filter unit 23 described below. In the following description, an area that is a capturing target of the camera 1 will be referred to as the capturing area. In a case where the camera 1 is a monitoring camera that is used for monitoring purposes, the capturing area may be referred to as a monitoring area. The lens 22 as the capturing optical system is configured to include a plurality of lenses that are optical components such as a focus lens capable of adjusting the focal length of the camera 1 and a zoom lens capable of changing the zoom magnification of the camera 1.

Each IR-LED 32 is an IR illumination unit for irradiating the capturing area with IR light. The light intensity (brightness) of IR light with which the capturing area is irradiated can be adjusted by a control unit 11 (refer to FIG. 2) and an IR-LED control unit 31 as a controller incorporated in the camera 1. In addition, each IR-LED 32 is configured to include a plurality of IR illuminations having different irradiation distances or irradiation ranges (irradiation angles). The camera 1 can appropriately adjust the type, quantity, and light intensity (brightness) of the IR-LEDs 32 to be used for irradiation depending on the zoom magnification of the lens 22. Each IR-LED 32 is one example of an IR illumination unit capable of performing irradiation of IR light and is not limited to a light emission diode (LED).

Figure 2:
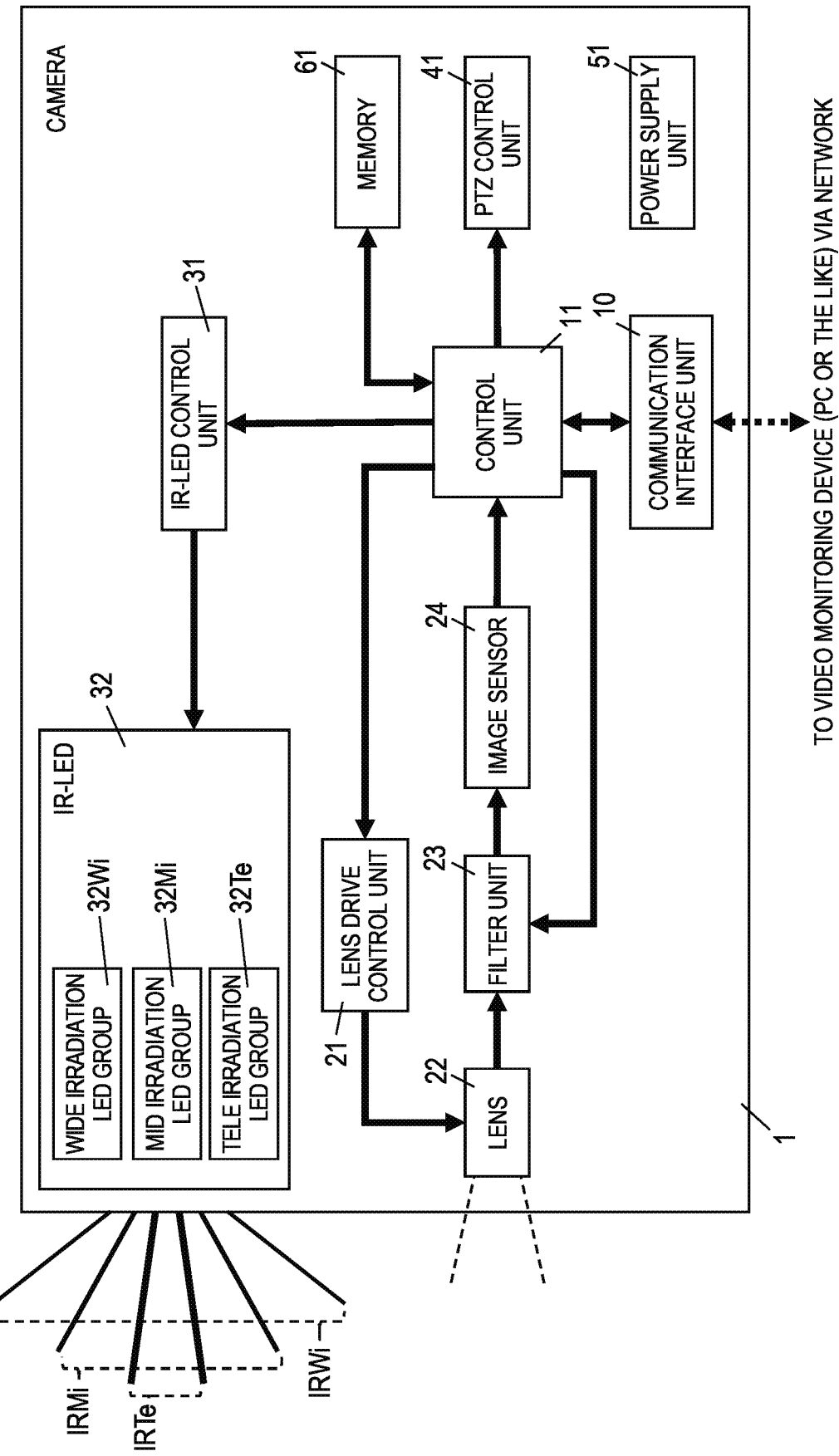
FIG. 2 is a block diagram illustrating one example of an internal configuration of the camera.

FIG. 2 is a diagram illustrating one example of an internal configuration of the camera 1. The camera 1 as one example of the camera device is configured to include a communication interface unit 10, the control unit 11, a lens drive control unit 21, the lens 22, the filter unit 23, the image sensor 24, the IR-LED control unit 31, the IR-LEDs 32, a PTZ control unit 41, a power supply unit 51, and a memory 61.

The communication interface unit 10 is configured using a communication circuit for transmitting and receiving data or information with a network (for example, an intranet or the Internet) to which the camera 1 is connected. The communication interface unit 10 transmits and receives data or information with a video monitoring device (for example, a personal computer (PC) or a server) or other cameras (not illustrated) connected to the network.

For example, the control unit 11 as one example of the controller is configured using a central processing unit (CPU), a digital signal processor (DSP), or a field programmable gate array (FPGA). The control unit 11 functions as a controller of the operation of the camera 1 and performs a control process for managing the operation of all units of the camera 1, a data input-output process with each unit of the camera 1, a data operation (calculation) process, and a data storage process. The control unit 11 operates in accordance with a program stored in the memory 61. When the control unit 11 operates, the control unit 11 uses the memory 61 and stores data generated by the control unit 11 in the memory 61.

For example, the control unit 11 reads and obtains parameters (for example, a pan rotation amount, a tilt rotation amount, and the zoom magnification) corresponding to one or more predetermined preset positions from the memory 61. The control unit 11 can instruct the PTZ control unit 41 to change the posture and the zoom magnification of the camera 1 by executing at least one of the pan rotation, the tilt rotation, and the zoom process such that the optical axis is directed to any preset position. The control unit 11 generates a control signal for PTZ control including the parameters such as the pan rotation amount, the tilt rotation amount, and the zoom magnification and transmits the control signal to the PTZ control unit 41. The PTZ control unit 41 executes at least one of the pan rotation, the tilt rotation, and the zoom process based on the control signal from the control unit 11.

For example, the control unit 11 can store information related to the current (most recent) zoom magnification (that is, the zoom magnification corresponding to the most recent focal length of the lens 22) of the lens 22 in the memory 61 and obtain the information related to the zoom magnification. The control unit 11 can directly instruct the lens drive control unit 21 to change the zoom magnification of the lens 22 without passing through the PTZ control unit 41. In a case where the zoom magnification reaches a predetermined zoom magnification (refer to FIG. 5), the control unit 11 controls irradiation of a plurality of types of IR light with which the IR-LEDs 32 can perform irradiation. Details of an operation procedure example of the control of IR light irradiation will be described below with reference to FIG. 4A, FIG. 4B, and FIG. 5.

For example, in order to change the brightness of IR light (in other words, a current amount (value) that is supplied to the IR-LEDs 32 in order to perform irradiation of IR light corresponding to the zoom magnification) of irradiation from the IR-LEDs 32, the control unit 11 generates a change instruction for the supplied current amount of the IR-LEDs 32 and transmits the change instruction to the IR-LED control unit 31.

For example, the control unit 11 generates a filter switching signal for switching a filter for transmitting light from the lens 22 (that is, light from the capturing area) in the filter unit 23 and transmits the filter switching signal to the filter unit 23. For example, during daytime, the control unit 11 generates the filter switching signal for selecting an IR cut filter in order to easily obtain the captured image of visible light. During nighttime, the control unit generates the filter switching signal for selecting a visible light cut filter in order to easily obtain the captured image of IR light.

The lens drive control unit 21 changes the zoom magnification of the lens 22 in accordance with the change instruction for the zoom magnification of the lens 22 from the control unit 11 or a change instruction from the PTZ control unit 41.

In the lens 22 as one example of a capturing unit, light from the capturing area is incident, and the light is imaged on the image sensor 24 through the filter unit 23. As described above, the lens 22 as the capturing optical system is configured to include a plurality of lenses that are optical components such as a focus lens capable of adjusting the focal length of the camera 1 and a zoom lens capable of changing the zoom magnification of the camera 1.

The filter unit 23 as one example of the capturing unit includes a plurality of filters (for example, the IR cut filter and the visible light cut filter) and selectively switches one filter transmitting light from the lens 22 among the plurality of filters depending on the filter switching signal from the control unit 11. The IR cut filter is a filter that can block a wavelength in an IR light range. The visible light cut filter is a filter that can block a wavelength in a visible light range. The filter unit 23 may be omitted from the camera 1.

The image sensor 24 as one example of the capturing unit is configured using a charge coupled device (CCD) or a complementary metal oxide semiconductor (CMOS) as a solid state capturing element. In addition, the image sensor 24 may include a chip that includes an image processing circuit for generating data of the captured image by performing well-known signal processing for image processing on an electric signal of a subject image output from the solid state capturing element. The data of the captured image generated by the image sensor 24 is input into the control unit 11. The image sensor 24 may further include a gain adjustment unit that can adjust the sensitivity of the capturing element.

The IR-LED control unit 31 as one example of the controller adjusts the irradiation range of IR light with which the capturing area is irradiated, depending on the zoom magnification by variably controlling the current amount (value) supplied to each IR-LED 32 (refer to the description below) based on the change instruction corresponding to the zoom magnification from the control unit 11.

Each IR-LED 32 is an IR illumination unit that irradiates the capturing area with IR light. For example, each IR-LED 32 includes an LED group that can perform irradiation of IR light having three types of different irradiation ranges. Specifically, each IR-LED 32 includes a WIDE irradiation LED group 32Wi, a MID irradiation LED group 32Mi, and a TELE irradiation LED group 32Te.

The WIDE irradiation LED group 32Wi as one example of a first IR illumination unit can perform irradiation of first IR light (hereinafter, referred to as "WIDE IR light") having a first irradiation range of the widest angle. For example, the main capturing area for WIDE IR light IRWi is a location at a short distance from the camera 1 during nighttime. Irradiation of the WIDE IR light IRWi is performed in order to capture a wide field of view at a low zoom magnification.

The MID irradiation LED group 32Mi as one example of a second IR illumination unit can perform irradiation of second IR light (hereinafter, referred to as "MID IR light") having a second irradiation range of the second widest angle. For example, the main capturing area for MID IR light IRMi is a location at a middle distance from the camera 1 during nighttime. Irradiation of the MID IR light IRMi is performed in order to capture a wide field of view at a certainly high zoom magnification.

The TELE irradiation LED group 32Te as one example of a third IR illumination unit can perform irradiation of third IR light (hereinafter, referred to as "TELE IR light") having a third irradiation range of the narrowest angle. For example, the main capturing area for TELE IR light IRTe is a location at a long distance from the camera 1 during nighttime. Irradiation of the TELE IR light IRTe is performed in order to capture a slightly narrow field of view at a significantly high zoom magnification.

In the following description, the above three types of LED groups included in each IR-LED 32 will be illustrated for easy understanding of the description. However, the three types are not for limitation purposes. For example, two types having slightly different irradiation ranges may be disposed as the MID irradiation LED group 32Mi.

The PTZ control unit 41 executes each of the pan rotation of the casing of the camera 1 on the lower side of the pan rotation surface RT1 and the tilt rotation of the tilt unit TLU based on the control signal that is generated by the control unit 11 depending on the parameters (refer to the above description) corresponding to the preset position. In addition, the PTZ control unit 41 transmits the change instruction for the zoom magnification of the lens 22 to the lens drive control unit 21 based on the control signal that is generated by the control unit 11 depending on the parameters (refer to the above description) corresponding to the preset position. For example, this PTZ control is executed based on the control signal generated by the control unit 11 by a trigger of an input of an execution instruction from the video monitoring device connected through the network into the control unit 11 through the communication interface unit 10.

The power supply unit 51 supplies power to the camera 1 from an external commercial power supply. The power supply unit 51 may be directly supplied with power from the external commercial power supply. In addition, the power supply unit 51 may be configured such that a battery (for example, a cell) that can accumulate electric charges supplied from the external commercial power supply is included in the power supply unit 51 or can be attached to and detached from the power supply unit 51. The power supply unit 51 may be able to supply power to the camera 1 even in a state where the power supply unit 51 is disconnected from the external commercial power supply.

The memory 61 is configured using a random access memory (RAM) and a read only memory (ROM) and stores a program necessary for executing the operation of the camera 1 and also temporarily stores data or information generated during the operation. For example, the RAM is a work memory that is used at the time of operation of the control unit 11. For example, the ROM stores a program for controlling the control unit 11 in advance.

Figure 4A:
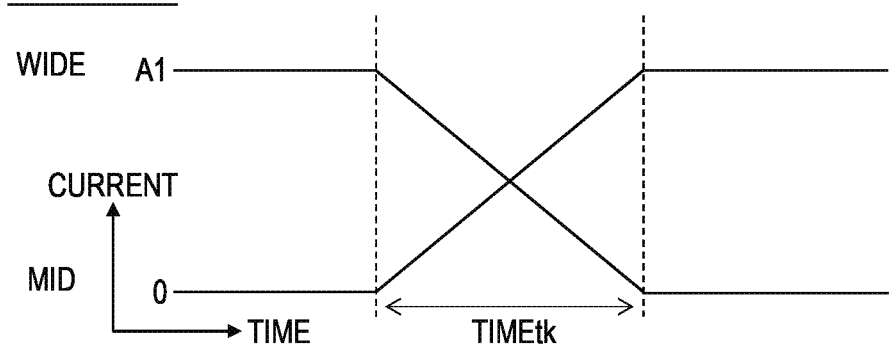
FIG. 4A is a diagram illustrating one example of current control in a time direction between WIDE and MID.
Figure 4B:
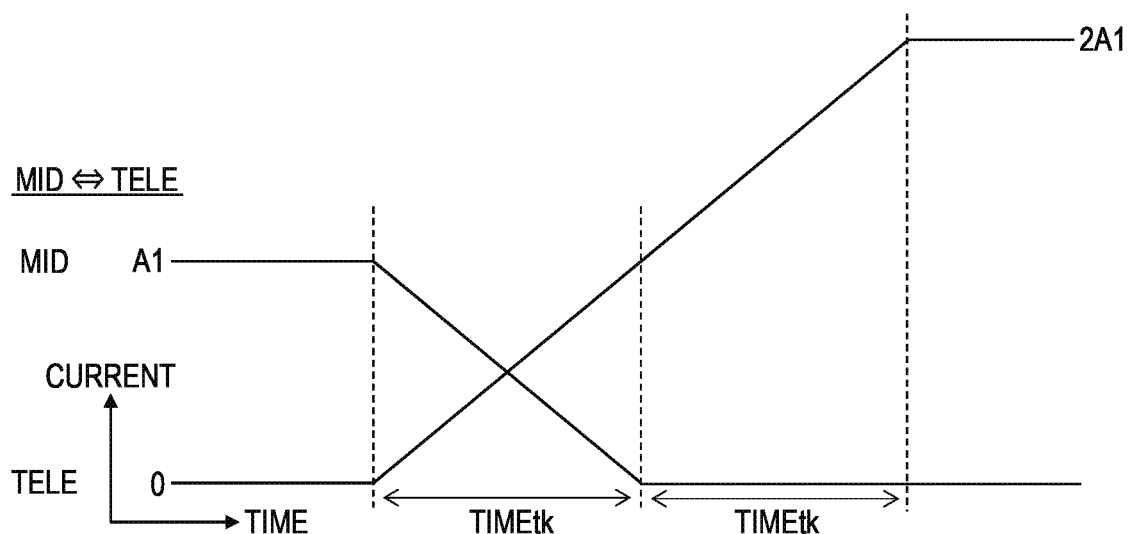
FIG. 4B is a diagram illustrating one example of current control in the time direction between MID and TELE.
Figure 5:
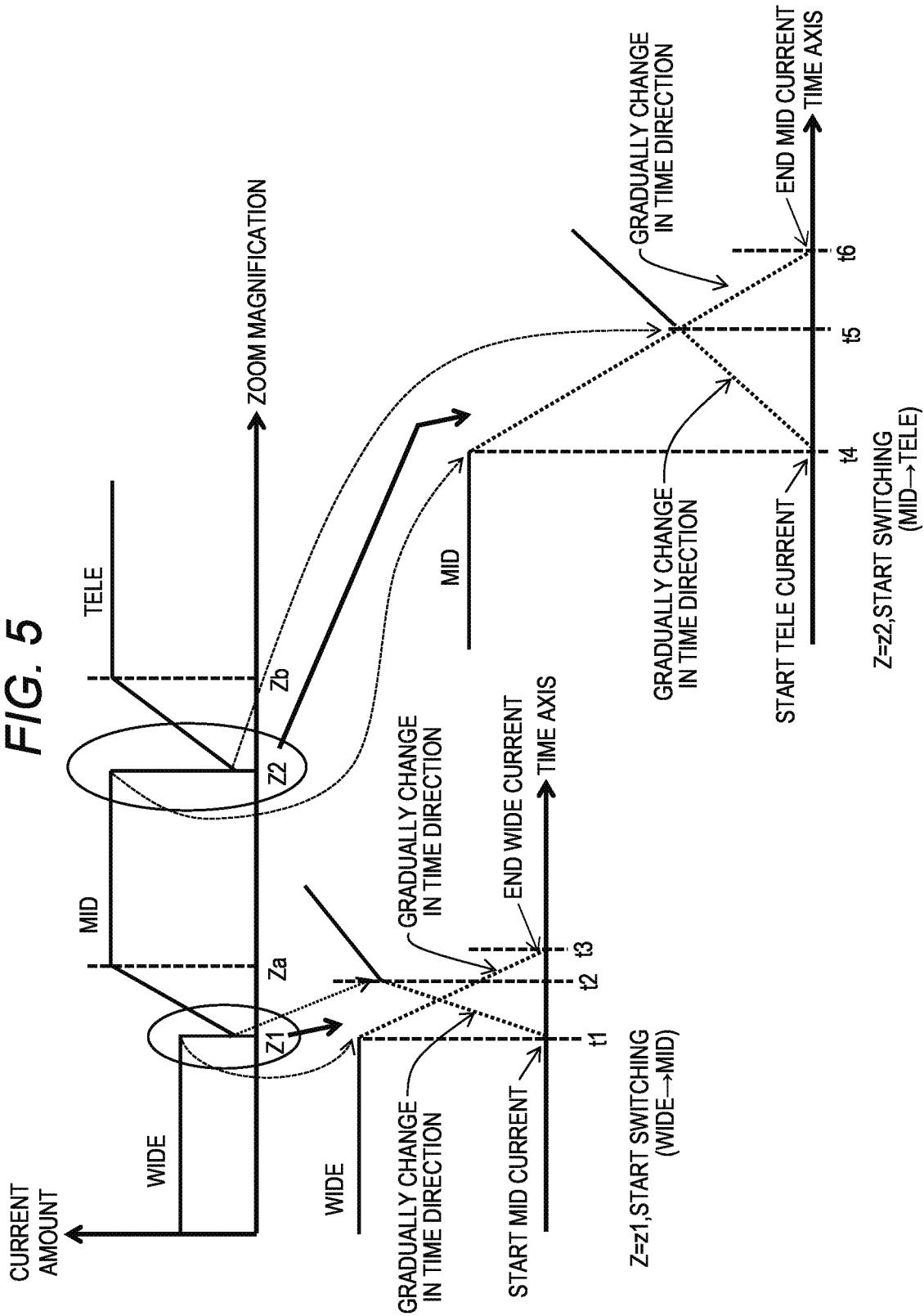
FIG. 5 is a diagram illustrating one example of current control for irradiation of IR light corresponding to a zoom magnification according to Embodiment 1.

Next, the operation procedure example of the control of IR light irradiation in the camera 1 according to Embodiment 1 will be described with reference to each of FIG. 4A, FIG. 4B, and FIG. 5. FIG. 4A is a diagram illustrating one example of current control in a time direction between WIDE and MID. FIG. 4B is a diagram illustrating one example of current control in the time direction between MID and TELE. FIG. 5 is a diagram illustrating one example of current control for irradiation of IR light corresponding to the zoom magnification according to Embodiment 1. In FIG. 4A, FIG. 4B, and FIG. 5, for convenience, the irradiation range of the WIDE IR light is denoted by "WIDE". The irradiation range of the MID IR light is denoted by "MID". The irradiation range of the TELE IR light is denoted by "TELE". In addition, while FIG. 4A, FIG. 4B, and FIG. 5 are illustrations for facilitating understanding of zoom-in (that is, WIDE→MID→TELE), the same can be applied to a description of the zoom-out (that is, TELE→MID→WIDE), and the magnitudes of times ta, tb, tc, td, and to are not important.

In FIG. 4A, a horizontal axis denotes time, and a vertical axis denotes the current amount (value) supplied to the WIDE irradiation LED group 32Wi or the MID irradiation LED group 32Mi. In order to simplify the description of FIG. 4A, it is assumed that each of the WIDE irradiation LED group 32Wi and the MID irradiation LED group 32Mi is configured with the same number of LEDs (for example, two).

For example, a case where a zoom magnification Z reaches a predetermined zoom magnification z1 (refer to FIG. 5) for switching the irradiation range of IR light from "WIDE" to "MID" at time ta is considered. That is, it is considered that the zoom process in the camera 1 is zoom-in from "WIDE" to "MID". In this case, the control unit 11 transmits, to the IR-LED control unit 31, a change instruction for gradually decreasing the supplied current amount of the WIDE irradiation LED group 32Wi from a predetermined current value (for example, A1) at a time immediately before the zoom magnification Z reaches z1 to zero at time tb over a predetermined time period tk. The IR-LED control unit 31 adjusts the supplied current amount of the WIDE irradiation LED group 32Wi in accordance with the change instruction. The control unit 11 transmits, to the IR-LED control unit 31, a change instruction for gradually increasing the supplied current amount of the MID irradiation LED group 32Mi from zero to a predetermined current value (for example, A1) at time tb over the predetermined time period tk. The IR-LED control unit 31 adjusts the supplied current amount of the MID irradiation LED group 32Mi in accordance with the change instruction.

In addition, for example, a case where the zoom magnification Z reaches the predetermined zoom magnification z1 (refer to FIG. 5) for switching the irradiation range of IR light from "MID" to "WIDE" at time tb is considered. That is, it is considered that the zoom process in the camera 1 is zoom-out from "MID" to "WIDE". In this case, the control unit 11 transmits, to the IR-LED control unit 31, a change instruction for gradually decreasing the supplied current amount of the MID irradiation LED group 32Mi from a predetermined current value (for example, A1) at a time immediately before the zoom magnification Z reaches z1 to zero at time to over the predetermined time period tk. The IR-LED control unit 31 adjusts the supplied current amount of the MID irradiation LED group 32Mi in accordance with the change instruction. The control unit 11 transmits, to the IR-LED control unit 31, a change instruction for gradually increasing the supplied current amount of the WIDE irradiation LED group 32Wi from zero to a predetermined current value (for example, A1) at time tb over the predetermined time period tk. The IR-LED control unit 31 adjusts the supplied current amount of the WIDE irradiation LED group 32Wi in accordance with the change instruction.

In FIG. 4B, a horizontal axis denotes time, and a vertical axis denotes the current amount (value) supplied to the MID irradiation LED group 32Mi or the TELE irradiation LED group 32Te. In order to simply the description of FIG. 4B, it is assumed that the MID irradiation LED group 32Mi is configured with, for example, two LEDs, and the TELE irradiation LED group 32Te is configured with, for example, four LEDs that are double the number of LEDs of the MID irradiation LED group 32Mi.

For example, a case where the zoom magnification Z reaches a predetermined zoom magnification z2 (refer to FIG. 5) for switching the irradiation range of IR light from "MID" to "TELE" at time tc is considered. That is, it is considered that the zoom process in the camera 1 is zoom-in from "MID" to "TELE". In this case, the control unit 11 transmits, to the IR-LED control unit 31, a change instruction for gradually decreasing the supplied current amount of the MID irradiation LED group 32Mi from a predetermined current value (for example, A1) at a time immediately before the zoom magnification Z reaches z2 to zero at time td over the predetermined time period tk. The IR-LED control unit 31 adjusts the supplied current amount of the WIDE irradiation LED group 32Wi in accordance with the change instruction. The control unit 11 transmits, to the IR-LED control unit 31, a change instruction for gradually increasing the supplied current amount of the TELE irradiation LED group 32Te from zero to a predetermined current value (for example, 2A1) at time tc over a predetermined time period 2tk. The IR-LED control unit 31 adjusts the supplied current amount of the TELE irradiation LED group 32Te in accordance with the change instruction.

In addition, for example, a case where the zoom magnification Z reaches the predetermined zoom magnification z2 (refer to FIG. 5) for switching the irradiation range of IR light from "TELE" to "MID" at time tc is considered. That is, it is considered that the zoom process in the camera 1 is zoom-out from "TELE" to "MID". In this case, the control unit 11 transmits, to the IR-LED control unit 31, a change instruction for gradually decreasing the supplied current amount of the TELE irradiation LED group 32Te from a predetermined current value (for example, 2A1) at a time immediately before the zoom magnification Z reaches z2 to zero at time tc over the predetermined time period 2tk. The IR-LED control unit 31 adjusts the supplied current amount of the TELE irradiation LED group 32Te in accordance with the change instruction. The control unit 11 transmits, to the IR-LED control unit 31, a change instruction for gradually increasing the supplied current amount of the MID irradiation LED group 32Mi from zero at time td to a predetermined current value (for example, A1) at time tc over the predetermined time period tk. The IR-LED control unit 31 adjusts the supplied current amount of the MID irradiation LED group 32Mi in accordance with the change instruction.

Next, the control of IR light irradiation at the time of zoom-in or zoom-out will be more specifically described with reference to FIG. 5. FIG. 5 illustrates a relationship between the zoom magnification controlled by the camera 1 according to Embodiment 1 and the characteristics of the current amount (value) supplied to the WIDE irradiation LED group 32Wi, the MID irradiation LED group 32Mi, and the TELE irradiation LED group 32Te. In the graph in the upper part of FIG. 5, a horizontal axis denotes the zoom magnification, and a vertical axis denotes the current amount (value) supplied to the WIDE irradiation LED group 32Wi, the MID irradiation LED group 32Mi, and the TELE irradiation LED group 32Te. In the two graphs in the lower part of FIG. 5 that illustrates details of a part of the graph in the upper part, a horizontal axis denotes time, and a vertical axis denotes the current amount (value) supplied to the WIDE irradiation LED group 32Wi, the MID irradiation LED group 32Mi, and the TELE irradiation LED group 32Te.

In order to simplify the description of FIG. 5, the control of IR light irradiation at the time of zoom-in will be described. However, the same can be applied to the control of IR light irradiation at the time of zoom-out by reversing the flow of time in the control of IR light irradiation at the time of zoom-in. In a case where the zoom magnification is less than a predetermined zoom magnification (for example, z1), the control unit 11 generates a maintaining instruction for maintaining the supplied current amount of the WIDE irradiation LED group 32Wi at a constant predetermined current value (for example, A4) and transmits the maintaining instruction to the IR-LED control unit 31. The IR-LED control unit 31 constantly maintains the supplied current amount of the WIDE irradiation LED group 32Wi in accordance with the maintaining instruction.

For example, a case where the zoom magnification Z reaches the predetermined zoom magnification z1 for switching the irradiation range of IR light from "WIDE" to "MID" at time t1 is considered. The control unit 11 transmits, to the IR-LED control unit 31, a change instruction for gradually decreasing the supplied current amount of the WIDE irradiation LED group 32Wi from a predetermined current value at a time immediately before the zoom magnification Z reaches z1 to zero at time t3 in the time direction over a predetermined time period (t3–t1). The IR-LED control unit 31 adjusts the supplied current amount of the WIDE irradiation LED group 32Wi in accordance with the change instruction.

The control unit 11 transmits, to the IR-LED control unit 31, a change instruction for gradually increasing the supplied current amount of the MID irradiation LED group 32Mi from zero to a predetermined current value at time t2 in the time direction over a predetermined time period (t2–t1). Furthermore, the control unit 11 transmits, to the IR-LED control unit 31, a change instruction for adjusting the supplied current amount of the MID irradiation LED group 32Mi to a predetermined current value at time t2 and then, for example, linearly changing the current amount depending on the zoom magnification in a case where the zoom magnification Z reaches za from z1. The IR-LED control unit 31 adjusts the supplied current amount of the MID irradiation LED group 32Mi in accordance with the change instruction.

In addition, for example, a case where the zoom magnification Z reaches the predetermined zoom magnification z2 for switching the irradiation range of IR light from "MID" to "TELE" at time t4 is considered. The control unit 11 transmits, to the IR-LED control unit 31, a change instruction for gradually decreasing the supplied current amount of the MID irradiation LED group 32Mi from a predetermined current value at a time immediately before the zoom magnification Z reaches z2 to zero at time t6 in the time direction over a predetermined time period (t6–t4). The IR-LED control unit 31 adjusts the supplied current amount of the MID irradiation LED group 32Mi in accordance with the change instruction.

The control unit 11 transmits, to the IR-LED control unit 31, a change instruction for gradually increasing the supplied current amount of the TELE irradiation LED group 32Te from zero to a predetermined current value at time t5 in the time direction over a predetermined time period (t5–t4). Furthermore, the control unit 11 transmits, to the IR-LED control unit 31, a change instruction for adjusting the supplied current amount of the TELE irradiation LED group 32Te to a predetermined current value at time t5 and then, for example, linearly changing the current amount depending on the zoom magnification in a case where the zoom magnification Z reaches zb from z2. The IR-LED control unit 31 adjusts the supplied current amount of the MID irradiation LED group 32Mi in accordance with the change instruction.

Figure 6:
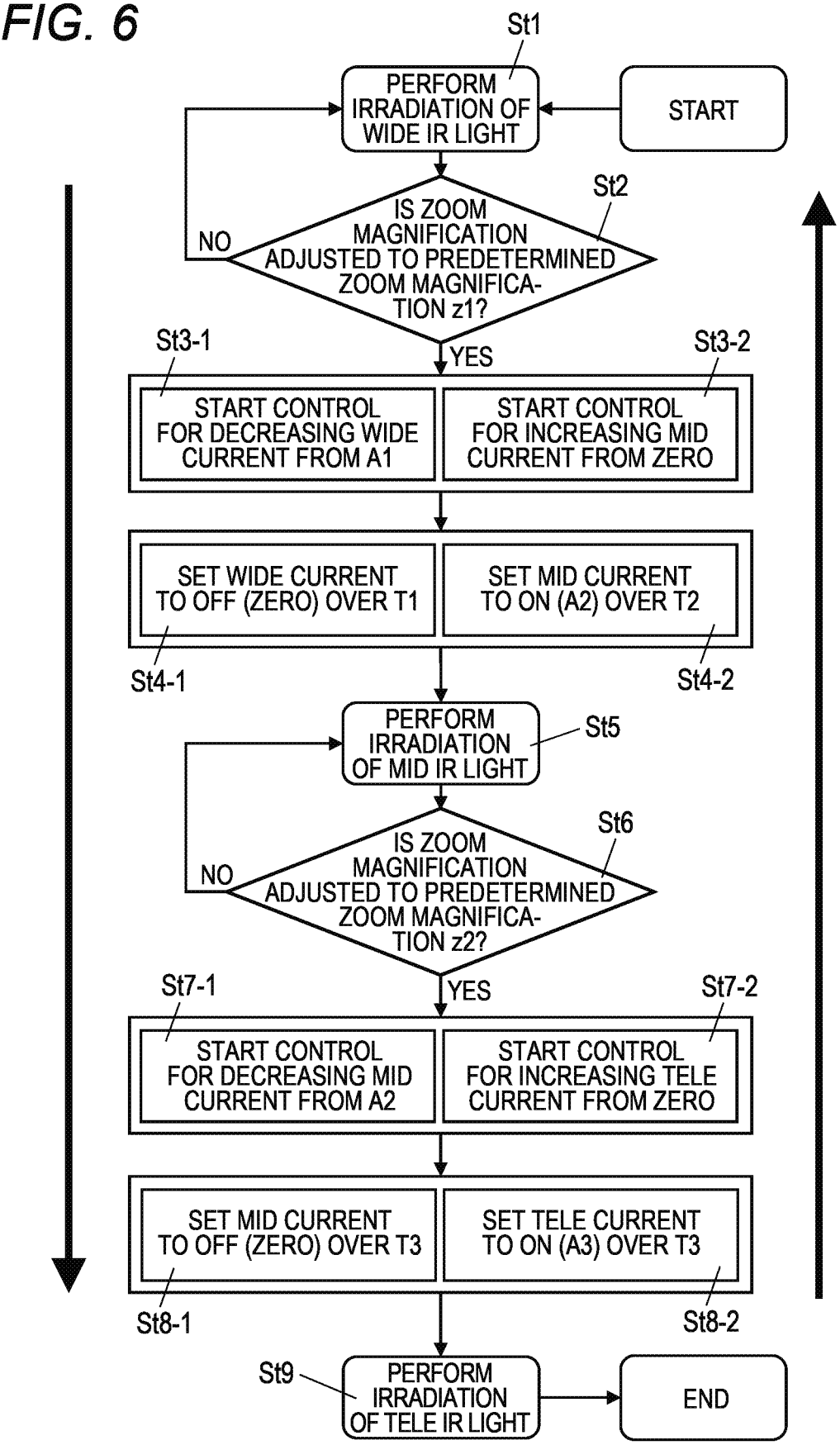
FIG. 6 is a flowchart illustrating one example of an operation procedure of IR light irradiation by a camera according to Embodiment 1.

Next, the operation procedure example of the control of IR light irradiation by the camera 1 according to Embodiment 1 will be described with reference to FIG. 6. FIG. 6 is a flowchart illustrating one example of the operation procedure of IR light irradiation by the camera according to Embodiment 1. In FIG. 6, the control of IR light irradiation at the time of zoom-in is described in the same manner as FIG. 5. However, the same can be applied to the control of IR light irradiation by performing the processes in FIG. 6 in reverse order. As the premise of the description of FIG. 6, it is assumed that the camera 1 performs irradiation of the WIDE IR light.

In FIG. 6, the camera 1 performs irradiation of the WIDE IR light (refer to FIG. 2) (St1). The control unit 11 obtains and recognizes the current zoom magnification at all times from the memory 61 and determines whether or not the zoom magnification is adjusted to the predetermined zoom magnification z1 (refer to FIG. 5) (St2). In a case where the zoom magnification is not adjusted to the predetermined zoom magnification z1 (in other words, in a case where the zoom magnification is less than z1) (St2, NO), the camera 1 continues performing the process of step St1 (that is, irradiation of the WIDE IR light).

In a case where the control unit 11 determines that the zoom magnification is adjusted to the predetermined zoom magnification z1 (St2, YES), the control unit 11 performs control for gradually decreasing the supplied current amount of the WIDE irradiation LED group 32Wi from a predetermined current value (for example, A1 illustrated in FIG. 4A) at a time immediately before the zoom magnification reaches z1 to zero over a predetermined time period (for example, tk illustrated in FIG. 4A) (St3-1; refer to FIG. 4A). The IR-LED control unit 31 adjusts the supplied current amount of the WIDE irradiation LED group 32Wi under control of the control unit 11. In addition, the control unit 11 performs control for gradually increasing the supplied current amount of the MID irradiation LED group 32Mi from zero to a predetermined current value (for example, A1 illustrated in FIG. 4A) over a predetermined time period (for example, tk illustrated in FIG. 4A) (St3-2; refer to FIG. 4A). The IR-LED control unit 31 adjusts the supplied current amount of the MID irradiation LED group 32Mi under control of the control unit 11.

Accordingly, the camera 1 can gradually perform irradiation of the WIDE IR light to the MID IR light in the time direction when the zoom magnification reaches the predetermined zoom magnification z1 (St4). Thus, occurrence of a difference in brightness of IR light caused by instantaneously switching from irradiation of the WIDE IR light to irradiation of the MID IR light as in the technology of the related art can be reduced.

In addition, the control unit 11 determines whether or not the zoom magnification is adjusted to the predetermined zoom magnification z2 (refer to FIG. 5) (St5). In a case where the zoom magnification is not adjusted to the predetermined zoom magnification z2 (in other words, in a case where the zoom magnification is greater than or equal to z1 and less than z2) (St5, NO), the camera 1 continues performing the process of step St4 (that is, irradiation of the MID IR light).

In a case where the control unit 11 determines that the zoom magnification is adjusted to the predetermined zoom magnification z2 (St5, YES), the control unit 11 performs control for gradually decreasing the supplied current amount of the MID irradiation LED group 32Mi from a predetermined current value (for example, A1 illustrated in FIG. 4B) at a time immediately before the zoom magnification reaches z2 to zero over a predetermined time period (for example, tk illustrated in FIG. 4B) (St6-1; refer to FIG. 4B). The IR-LED control unit 31 adjusts the supplied current amount of the MID irradiation LED group 32Mi under control of the control unit 11. In addition, the control unit 11 performs control for gradually increasing the supplied current amount of the TELE irradiation LED group 32Te from zero to a predetermined current value (for example, 2A1 illustrated in FIG. 4B) over a predetermined time period (for example, 2tk illustrated in FIG. 4B) (St6-2; refer to FIG. 4B). The IR-LED control unit 31 adjusts the supplied current amount of the TELE irradiation LED group 32Te under control of the control unit 11.

Accordingly, the camera 1 can gradually perform irradiation of the MID IR light to the TELE IR light in the time direction when the zoom magnification reaches the predetermined zoom magnification z2 (St7). Thus, occurrence of a difference in brightness of IR light generated by instantaneously switching from irradiation of the MID IR light to irradiation of the TELE IR light as in the technology of the related art can be reduced.

As described thus far, in the camera 1 according to Embodiment 1, the capturing unit includes the lens 22 on which light from the capturing area is incident, and performs capturing based on the light transmitted through the lens 22 from the capturing area. The WIDE irradiation LED group 32Wi can irradiate the capturing area with the first IR light having the first irradiation range (for example, WIDE). The MID irradiation LED group 32Mi can irradiate the capturing area with the second IR light having the second irradiation range (for example, MID) of a narrower angle than the first irradiation range. The control unit 11 obtains the zoom magnification of the lens 22 and controls irradiation of the first IR light and the second IR light in a case where the obtained current zoom magnification is equal to a predetermined zoom magnification (for example, z1). The control unit 11 changes the supplied current of the WIDE irradiation LED group 32Wi for irradiation of the first IR light over a first predetermined time period (for example, tk) and changes the supplied current of the MID irradiation LED group 32Mi for irradiation of the second IR light over a second predetermined time period (for example, tk).

Accordingly, by simple control, the camera 1 according to Embodiment 1 can gradually change the irradiation range of IR light from WIDE to MID or from MID to WIDE in the time direction at the time of performing the zoom process for obtaining an effective capturing image in the capturing of the capturing target scene in the capturing area. Accordingly, the camera 1 can reduce occurrence of a difference in brightness instantaneously caused at the time of changing the irradiation range as in the technology of the related art, and can adaptively reduce degradation of the image quality of the captured image. Thus, the camera 1 can improve the visibility of the captured image.

In addition, in a case where the current zoom magnification is increased to a predetermined zoom magnification (for example, z1), the control unit 11 decreases the supplied current of the WIDE irradiation LED group 32Wi from a predetermined current value (for example, A1) at a time immediately before the zoom magnification reaches the predetermined zoom magnification (for example, z1) to zero over the first predetermined time period (for example, tk). Furthermore, the control unit 11 increases the supplied current of the MID irradiation LED group 32Mi from zero to a predetermined current value (for example, A1) over the second predetermined time period (for example, tk). Accordingly, in the switching of the irradiation range of IR light from WIDE to MID by reaching the predetermined zoom magnification (for example, z1), the camera 1 does not instantaneously switch ON and OFF the WIDE IR light and the MID IR light having different brightnesses. The camera 1 can switch irradiation OFF by gradually decreasing the WIDE IR light in the time direction and switch irradiation ON by gradually increasing the MID IR light in the time direction. Accordingly, in the switching of the irradiation range of IR light from WIDE to MID, the camera 1 can effectively reduce degradation of the image quality of the captured image without causing a difference in brightness of IR light.

In addition, in a case where the current zoom magnification is decreased to a predetermined zoom magnification (for example, z1), the control unit 11 increases the supplied current of the WIDE irradiation LED group 32Wi from zero to a predetermined current value (for example, A1) over the first predetermined time period (for example, tk). Furthermore, the control unit 11 decreases the supplied current of the MID irradiation LED group 32Mi from a predetermined current value (for example, A1) at a time immediately before the zoom magnification reaches a predetermined zoom magnification (for example, z1) to zero over the second predetermined time period (for example, tk). Accordingly, in the switching of the irradiation range of IR light from MID to WIDE by reaching the predetermined zoom magnification (for example, z1), the camera 1 does not instantaneously switch ON and OFF the WIDE IR light and the MID IR light having different brightness. The camera 1 can switch irradiation OFF by gradually decreasing the MID IR light in the time direction and switch irradiation ON by gradually increasing the WIDE IR light in the time direction. Accordingly, in the switching of the irradiation range of IR light from MID to WIDE, the camera 1 can effectively reduce degradation of the image quality of the captured image without causing a difference in brightness of IR light.

In addition, the TELE irradiation LED group 32Te can irradiate the capturing area with the third IR light having the third irradiation range (for example, TELE) of a narrower angle than the second irradiation range. In a case where the current zoom magnification is increased to a predetermined second zoom magnification (for example, z2), the control unit 11 decreases the supplied current of the MID irradiation LED group 32Mi from a predetermined current value (for example, A1) at a time immediately before the zoom magnification reaches the predetermined second zoom magnification (for example, z2) to zero over a third predetermined time period (for example, tk). Furthermore, the control unit 11 increases the supplied current of the TELE irradiation LED group 32Te for performing irradiation of the third IR light from zero to a second predetermined current value (for example, 2A1) over a fourth predetermined time period (for example, 2tk). Accordingly, in the switching of the irradiation range of IR light from MID to TELE by reaching the predetermined zoom magnification (for example, z2), the camera 1 does not instantaneously switch ON and OFF the MID IR light and the TELE IR light having different brightness. The camera 1 can switch irradiation OFF by gradually decreasing the MID IR light in the time direction and switch irradiation ON by gradually increasing the TELE IR light in the time direction. Accordingly, in the switching of the irradiation range of IR light from MID to TELE, the camera 1 can effectively reduce degradation of the image quality of the captured image without causing a difference in brightness of IR light.

In addition, in a case where the current zoom magnification is decreased to the predetermined second zoom magnification (for example, z2), the control unit 11 increases the supplied current of the TELE irradiation LED group 32Te from a second predetermined current value (for example, 2A1) to zero over the fourth predetermined time period (for example, 2tk). Furthermore, the control unit 11 increases the supplied current of the MID irradiation LED group 32Mi from zero to a predetermined current value (for example, A1) over the third predetermined time period (for example, tk). Accordingly, in the switching of the irradiation range of IR light from TELE to MID by reaching the predetermined zoom magnification (for example, z2), the camera 1 does not instantaneously switch ON and OFF the MID IR light and the TELE IR light having different brightness. The camera 1 can switch irradiation OFF by gradually decreasing the TELE IR light in the time direction and switch irradiation ON by gradually increasing the MID IR light in the time direction. Accordingly, in the switching of the irradiation range of IR light from TELE to MID, the camera 1 can effectively reduce degradation of the image quality of the captured image without causing a difference in brightness of IR light.

Modification Example of Embodiment 1

In Embodiment 1, in a case where the zoom magnification reaches a predetermined zoom magnification (for example, z1), the WIDE IR light is controlled to gradually reach zero in the time direction over the first predetermined time period (for example, tk), and the MID IR light is controlled to gradually reach a predetermined current value (for example, A1) in the time direction over the second predetermined time period (for example, tk). In a modification example of Embodiment 1, an example of performing irradiation in a state where the WIDE IR light and the MID IR light are fixedly controlled to have different predetermined brightness while the zoom magnification is in a predetermined range (refer to FIG. 7) will be described.

An internal configuration of a camera according to the modification example of Embodiment 1 is the same as the internal configuration of the camera 1 according to Embodiment 1. Thus, the same configurations will be designated by the same reference signs, and descriptions of such configurations will be simplified or omitted. Different contents will be described.

Figure 7:
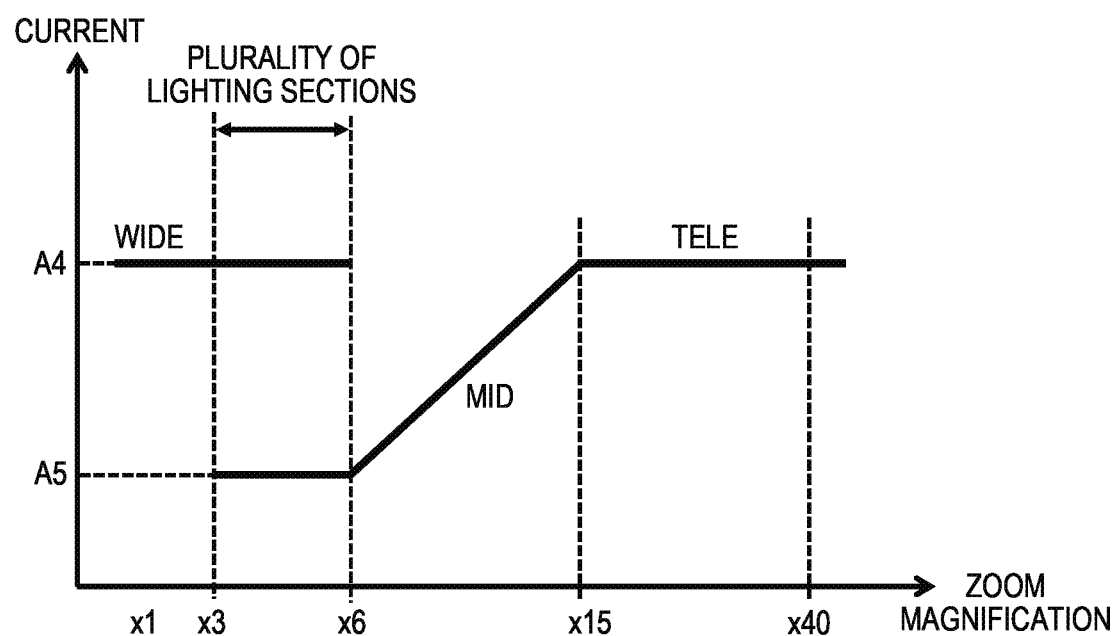
FIG. 7 is a diagram illustrating one example of current control for irradiation of IR light corresponding to a zoom magnification according to a modification example of Embodiment 1.

First, control of IR light irradiation at the time of zoom-in or zoom-out in the modification example of Embodiment 1 will be described with reference to FIG. 7. FIG. 7 is a diagram illustrating one example of current control for irradiation of IR light corresponding to the zoom magnification according to the modification example of Embodiment 1. FIG. 7 illustrates a relationship between the zoom magnification controlled by the camera 1 according to the modification example of Embodiment 1 and the characteristics of the current amount (value) supplied to the WIDE irradiation LED group 32Wi, the MID irradiation LED group 32Mi, and the TELE irradiation LED group 32Te. In the graph in FIG. 7, a horizontal axis denotes the zoom magnification, and a vertical axis denotes the current amount (value) supplied to the WIDE irradiation LED group 32Wi, the MID irradiation LED group 32Mi, and the TELE irradiation LED group 32Te. Each zoom magnification (for example, onefold, threefold, sixfold, fifteenfold, and fortyfold) illustrated on the horizontal axis in FIG. 7 is merely for illustrative purposes.

In order to simplify the description of FIG. 7, the control of IR light irradiation at the time of zoom-in will be described. However, the same can be applied to the control of IR light irradiation at the time of zoom-out by reversing the flow of time in the control of IR light irradiation at the time of zoom-in.

For example, a case where the current zoom magnification Z reaches a lower limit value (for example, "×3" indicating threefold) of the zoom magnification in the predetermined range is considered. In a case where the zoom magnification is less than the lower limit value of the zoom magnification in the predetermined range, the control unit 11 generates a maintaining instruction for maintaining the supplied current amount of the WIDE irradiation LED group 32Wi at a constant predetermined current value (for example, A4) and transmits the maintaining instruction to the IR-LED control unit 31. The IR-LED control unit 31 constantly maintains the supplied current amount of the WIDE irradiation LED group 32Wi in accordance with the maintaining instruction.

While the current zoom magnification Z reaches an upper limit value (for example, "×6" indicating sixfold") from the lower limit value (for example, "×3") of the zoom magnification in the predetermined range, the control unit 11 transmits, to the IR-LED control unit 31, a maintaining instruction for maintaining the supplied current amount of the WIDE irradiation LED group 32Wi at a predetermined current value (for example, A4) at a time immediately before the zoom magnification Z reaches z1. Furthermore, in a case where the current zoom magnification Z reaches the upper limit value (for example, "×6" indicating sixfold") of the zoom magnification in the predetermined range, the control unit 11 transmits, to the IR-LED control unit 31, a change instruction for gradually decreasing the supplied current amount of the WIDE irradiation LED group 32Wi from a predetermined current value (for example, A4) at a time immediately before the zoom magnification Z reaches "×6" to zero in the time direction over a predetermined time period. The IR-LED control unit 31 adjusts the supplied current amount of the WIDE irradiation LED group 32Wi in accordance with the maintaining instruction or the change instruction.

In a case where the current zoom magnification Z reaches the lower limit value (for example, "×3") of the zoom magnification in the predetermined range, the control unit 11 transmits, to the IR-LED control unit 31, a change instruction for gradually increasing the supplied current amount of the MID irradiation LED group 32Mi from zero to a predetermined current value (for example, A5) in the time direction over a predetermined time period. In addition, while the current zoom magnification Z reaches the upper limit value (for example, "×6" indicating sixfold") from the lower limit value (for example, "×3") of the zoom magnification in the predetermined range, the control unit 11 transmits, to the IR-LED control unit 31, a maintaining instruction for maintaining the supplied current amount of the MID irradiation LED group 32Mi at a predetermined current value (for example, A5) at a time immediately before the zoom magnification Z reaches "×6". Furthermore, in a case where the current zoom magnification Z reaches the upper limit value (for example, "×6" indicating sixfold) of the zoom magnification in the predetermined range, the control unit 11 generates a change instruction for linearly increasing the supplied current amount of the MID irradiation LED group 32Mi depending on the zoom magnification until the zoom magnification Z reaches a predetermined zoom magnification (for example, "×15"). The control unit 11 transmits the change instruction to the IR-LED control unit 31. The IR-LED control unit 31 adjusts the supplied current amount of the MID irradiation LED group 32Mi in accordance with the change instruction.

In addition, for example, a case where the zoom magnification Z reaches a predetermined zoom magnification (for example, "×15") for switching the irradiation range of IR light from "MID" to "TELE" is considered. The control unit 11 transmits, to the IR-LED control unit 31, a change instruction for gradually decreasing the supplied current amount of the MID irradiation LED group 32Mi from a predetermined current value (for example, A4) at a time immediately before the zoom magnification Z reaches "×15" to zero in the time direction over a predetermined time period. The IR-LED control unit 31 adjusts the supplied current amount of the MID irradiation LED group 32Mi in accordance with the change instruction.

The control unit 11 transmits, to the IR-LED control unit 31, a change instruction for gradually increasing the supplied current amount of the TELE irradiation LED group 32Te from zero to a predetermined current value (for example, A4) in the time direction over a predetermined time period. The IR-LED control unit 31 adjusts the supplied current amount of the TELE irradiation LED group 32Te in accordance with the change instruction.

Figure 8:
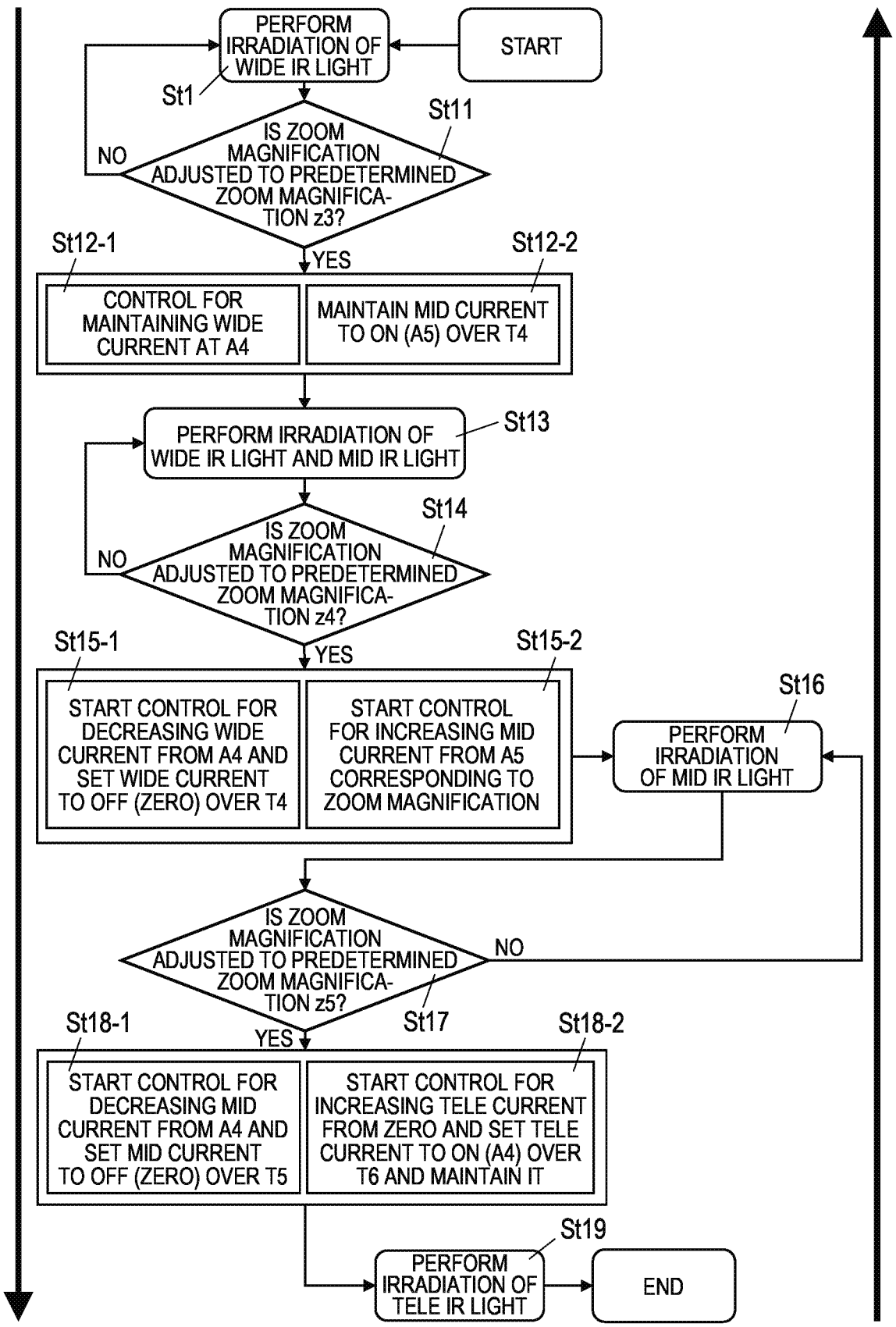
FIG. 8 is a flowchart illustrating one example of an operation procedure of IR light irradiation by a camera according to the modification example of Embodiment 1.

Next, the operation procedure example of the control of IR light irradiation by the camera 1 according to the modification example of Embodiment 1 will be described with reference to FIG. 8. FIG. 8 is a flowchart illustrating one example of the operation procedure of IR light irradiation by the camera according to the modification example of Embodiment 1. In FIG. 8, the control of IR light irradiation at the time of zoom-in is described in the same manner as FIG. 7. However, the same can be applied to the control of IR light irradiation by performing the process in FIG. 8 in reverse order. As the premise of the description of FIG. 8, it is assumed that the camera 1 performs irradiation of the WIDE IR light.

In addition, in the description of FIG. 8, the same processes as the processes in FIG. 6 will be designated by the same step numbers, and descriptions of such processes will be simplified or omitted. Different contents will be described.

In FIG. 8, the control unit 11 determines whether or not the zoom magnification is adjusted to a predetermined zoom magnification z3 (for example, "×3"; refer to FIG. 7) (St11).

In a case where the zoom magnification is not adjusted to the predetermined zoom magnification z3 (in other words, in a case where the zoom magnification is less than z3) (St11, NO), the camera 1 continues performing the process of step St11 (that is, irradiation of the WIDE IR light).

In a case where the control unit 11 determines that the zoom magnification is adjusted to the predetermined zoom magnification z3 (St11, YES), the control unit 11 performs maintaining control for maintaining the supplied current amount of the WIDE irradiation LED group 32Wi at a predetermined current value (for example, A4) at a time immediately before the zoom magnification Z reaches z3 (St12-1). The IR-LED control unit 31 adjusts the supplied current amount of the WIDE irradiation LED group 32Wi under control of the control unit 11. In addition, the control unit 11 performs control for gradually increasing the supplied current amount of the MID irradiation LED group 32Mi from zero to a predetermined current value (for example, A5) over a predetermined time period T4 (St12-2). The IR-LED control unit 31 adjusts the supplied current amount of the MID irradiation LED group 32Mi under control of the control unit 11.

Accordingly, when the zoom magnification reaches the predetermined zoom magnification z3, the camera 1 can gradually start irradiation of the MID IR light in the time direction while maintaining irradiation of the WIDE IR light (St13). Thus, occurrence of a difference in brightness of IR light caused by instantaneously switching from irradiation of the WIDE IR light to irradiation of the MID IR light as in the technology of the related art can be reduced.

In addition, the control unit 11 determines whether or not the zoom magnification is adjusted to a predetermined zoom magnification z4 (for example, "×6"; refer to FIG. 7) (St14). In a case where the zoom magnification is not adjusted to the predetermined zoom magnification z4 (in other words, in a case where the zoom magnification is greater than or equal to z3 and less than z4) (St14, NO), the camera 1 continues performing the process of step St13 (that is, irradiation of both of the WIDE IR light and the MID IR light).

In a case where the control unit 11 determines that the zoom magnification is adjusted to the predetermined zoom magnification z4 (St14, YES), the control unit 11 performs control for gradually decreasing the supplied current amount of the WIDE irradiation LED group 32Wi from a predetermined current value (for example, A4) at a time immediately before the zoom magnification reaches z4 to zero over the predetermined time period T4 (St15-1). The IR-LED control unit 31 adjusts the supplied current amount of the WIDE irradiation LED group 32Wi under control of the control unit 11. In addition, the control unit 11 performs control for linearly increasing the supplied current amount of the MID irradiation LED group 32Mi depending on the zoom magnification until a predetermined zoom magnification (for example, "×15") is reached (St15-2). The IR-LED control unit 31 adjusts the supplied current amount of the MID irradiation LED group 32Mi under control of the control unit 11.

Accordingly, the camera 1 can gradually perform irradiation of the WIDE IR light to the MID IR light in the time direction when the zoom magnification reaches the predetermined zoom magnification z4 (St16). Thus, occurrence of a difference in brightness of IR light caused by instantaneously switching from irradiation of the WIDE IR light to irradiation of the MID IR light as in the technology of the related art can be reduced.

In addition, the control unit 11 determines whether or not the zoom magnification is adjusted to a predetermined zoom magnification z5 (for example, "×15"; refer to FIG. 7) (St17). In a case where the zoom magnification is not adjusted to the predetermined zoom magnification z5 (in other words, in a case where the zoom magnification is greater than or equal to z4 and less than z5) (St17, NO), the camera 1 continues performing the process of step St16 (that is, irradiation of the MID IR light).

In a case where the control unit 11 determines that the zoom magnification is adjusted to the predetermined zoom magnification z5 (St17, YES), the control unit 11 performs control for gradually decreasing the supplied current amount of the MID irradiation LED group 32Mi from a predetermined current value (for example, A4) at a time immediately before the zoom magnification reaches z5 to zero over a predetermined time period T5 (St18-1). The IR-LED control unit 31 adjusts the supplied current amount of the MID irradiation LED group 32Mi under control of the control unit 11. In addition, the control unit 11 performs control for gradually increasing the supplied current amount of the TELE irradiation LED group 32Te from zero to a predetermined current value (for example, A4) over a predetermined time period T6 (St18-2). The IR-LED control unit 31 adjusts the supplied current amount of the TELE irradiation LED group 32Te under control of the control unit 11.

Accordingly, the camera 1 can gradually perform irradiation of the MID IR light to the TELE IR light in the time direction when the zoom magnification reaches the predetermined zoom magnification z5 (St19). Thus, occurrence of a difference in brightness of IR light generated by instantaneously switching from irradiation of the MID IR light to irradiation of the TELE IR light as in the technology of the related art can be reduced.

As described thus far, in the camera 1 according to the modification example of Embodiment 1, while the zoom magnification is equal to the zoom magnification in the predetermined range (for example, "×3" to "×6"), the control unit 11 maintains the supplied current of the WIDE irradiation LED group 32Wi at a third predetermined current value (for example, A4) at a time immediately before the zoom magnification reaches the lower limit value (for example, "×3") of the predetermined range. In addition, while the zoom magnification is equal to the zoom magnification in the predetermined range (for example, "×3" to "×6"), the control unit 11 maintains the supplied current of the MID irradiation LED group 32Mi at a fourth predetermined current value (for example, A5) which is increased from zero over the second predetermined time period (for example, T4) when the zoom magnification reaches the lower limit value (for example, "×3") of the predetermined range. Accordingly, while the zoom magnification is equal to the zoom magnification in the predetermined range (for example, "×3" to "×6"), the camera 1 can maintain irradiation of both of the WIDE IR light and the MID IR light without changing the different brightnesses of the WIDE IR light and the MID IR light. Thus, the image quality of the captured image can be improved in an environment that is appropriate for capturing the capturing area using the zoom magnification in the predetermined range.

Embodiment 2

Figure 9:
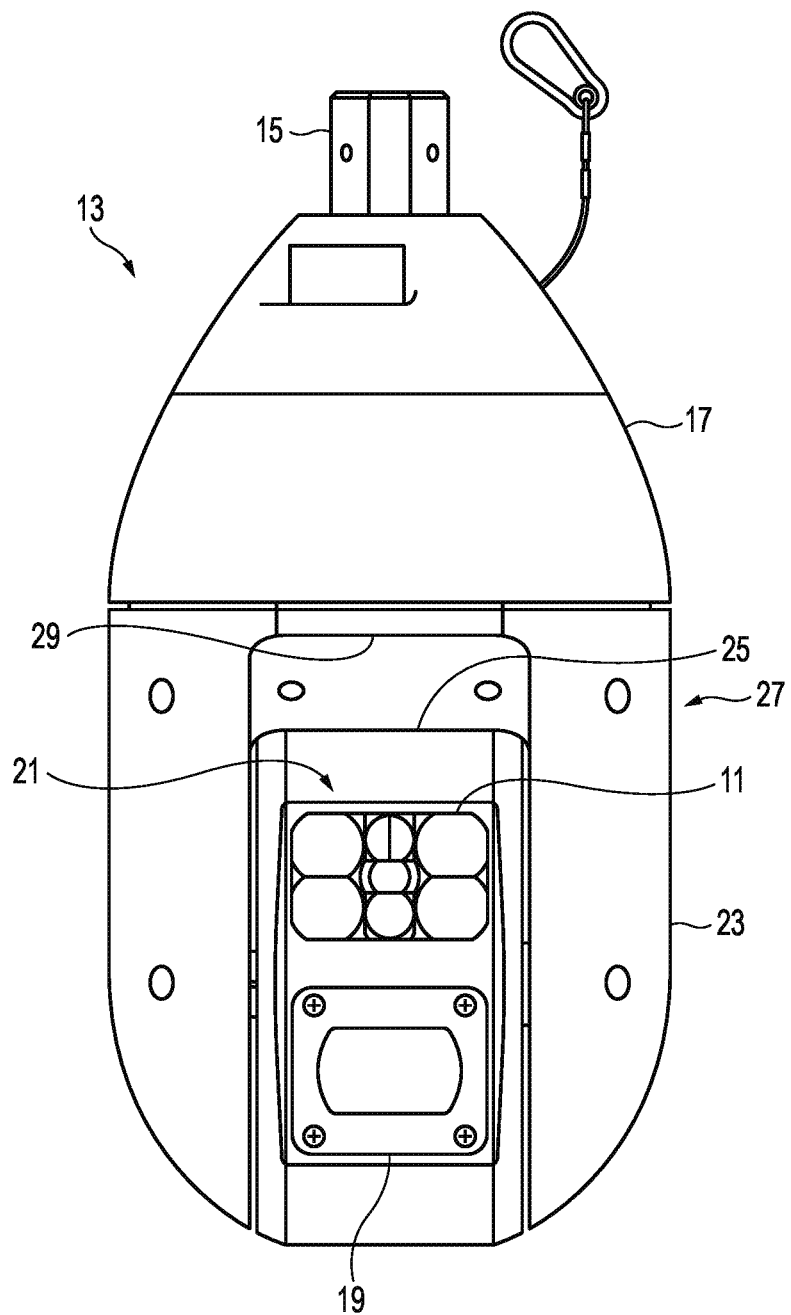
FIG. 9 is a front view of one example of a monitoring camera including a condensing lens according to Embodiment 2.

FIG. 9 is a front view of one example of a monitoring camera 13 including a condensing lens 111 according to Embodiment 2.

For example, the condensing lens 111 according to Embodiment 2 is disposed in the monitoring camera 13 that is a camera for crime prevention or monitoring. The condensing lens 111 may be disposed in a camera other than the camera for crime prevention or monitoring. A fixing base 17 that includes a fixing pipe 15 is formed in the upper portion of the monitoring camera 13. For example, the monitoring camera 13 is attached in a state where the monitoring camera 13 is mounted on a pole by fixing the fixing pipe 15 to a fixing tool (not illustrated).

The monitoring camera 13 includes a camera unit 19, an illumination device 121, a pan rotation mechanism 123, a tilt rotation mechanism 25, and a zoom mechanism (not illustrated).

The fixing base 17 is attached such that the pan rotation mechanism 123 freely rotates about a vertical axis. The pan rotation mechanism 123 causes a capturing direction of the camera unit 19 to turn about the vertical axis. The tilt rotation mechanism 25 is disposed in the pan rotation mechanism 123. The tilt rotation mechanism 25 is driven to turn by the pan rotation mechanism 123. The tilt rotation mechanism 25 holds the camera unit 19. The tilt rotation mechanism 25 drives the camera unit 19 to rotate about the center of the tilt rotation that is orthogonal to the center of the pan rotation. The pan rotation mechanism 123 and the tilt rotation mechanism 25 constitute a rotation base unit 27. The zoom mechanism can change the angle of view of the camera unit 19 by moving a predetermined lens of a capturing lens unit.

In the monitoring camera 13, the pan rotation mechanism 123 and the tilt rotation mechanism 25 are not covered with a so-called dome cover. That is, the monitoring camera 13 is configured as a dome coverless pan tilt zoom (PTZ) type.

The pan rotation mechanism 123 and the tilt rotation mechanism 25 in the PTZ type monitoring camera 13 constitute a multistage rotation drive mechanism in which the pan rotation mechanism 123 is the initial state on the fixing base 17 side.

In the case of capturing in a dark environment such as nighttime, the camera unit 19 captures a subject that is irradiated with illumination light (infrared illumination) from a light source unit 33 (refer to FIG. 11) through the condensing lens 111. The tilt rotation mechanism 25 holds the illumination device 121 along with the camera unit 19. The monitoring camera 13 in which the fixing base 17 is formed can capture a space immediately below the monitoring camera 13. However, in the capturing of a space immediately above the monitoring camera 13, the fixing base 17 in the upper portion is shown in the video. Thus, the rotation base unit 27 includes a vertically long opening portion 29 such that the tilt rotation in the upward direction can be secured as far as possible.

Figure 10:
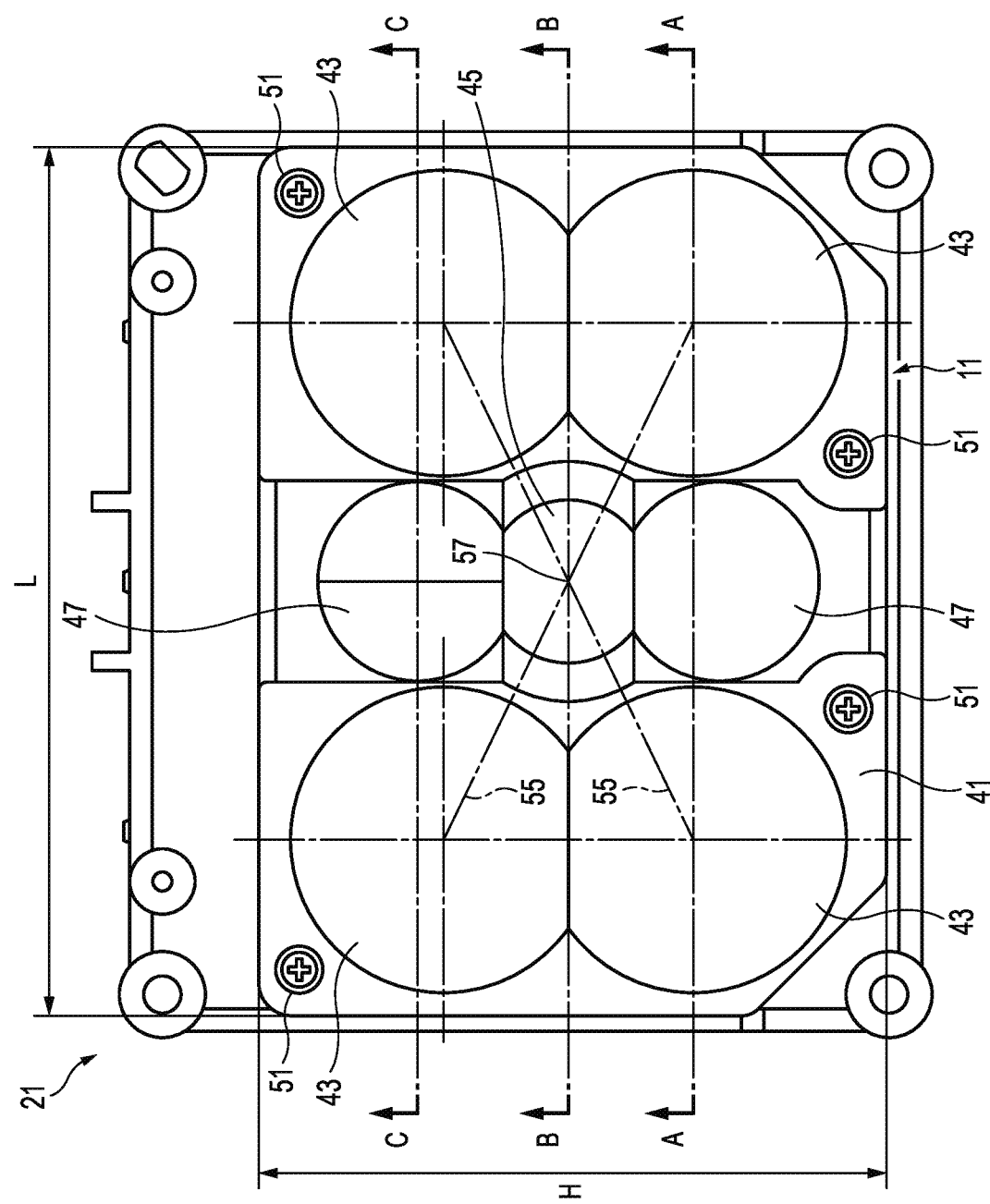
FIG. 10 is a front view of one example of the condensing lens illustrated in FIG. 9.

FIG. 10 is a front view of one example of the condensing lens 111 illustrated in FIG. 9.

The illumination device 121 includes a base 131, the light source unit 33 (refer to FIG. 11), and the condensing lens 111. The base 131 is formed in a quadrangular flat plate shape in a plan view. The light source unit 33 is formed by mounting a plurality of light sources (hereinafter, referred to as LEDs 37) on one surface of a substrate 35 (refer to FIG. 11). The light source unit 33 is fixed on one side of the base 131 such that each of the plurality of LEDs 37 faces the base 131. A plurality of through holes 39 (refer to FIG. 11) that pass through the plurality of LEDs 37 are bored in the base 131. The plurality of LEDs 37 are disposed in correspondence with the plurality of through holes 39. That is, the LEDs 37 irradiate a plurality of narrow angle lenses 43 with illumination light. In addition, the LEDs 37 irradiate a wide angle lens 45 with illumination light. In addition, the LEDs 37 irradiate a plurality of middle angle lenses 47 with illumination light.

The condensing lens 111 according to Embodiment 2 includes a frame 141, the plurality of narrow angle lenses 43, the wide angle lens 45, and the plurality of middle angle lenses 47. In each of the plurality of narrow angle lenses 43, the wide angle lens 45, and each of the plurality of middle angle lenses 47, a surface from which light is emitted on the opposite side from a boundary surface 49 on which light from the corresponding LED 37 among the plurality of LEDs 37 is incident is a spherical surface.

The frame 141 is fixed by each of a plurality of fixing screws 51 on the surface of the base 131 on the opposite side from a surface on which the light source unit 33 is fixed. In the frame 141, the plurality of narrow angle lenses 43, one wide angle lens 45, and the plurality of middle angle lenses 47 are formed as a single unit.

The frame 141 is formed in an approximately quadrangular shape in a plan view. More specifically, for example, the frame 141 has a horizontal dimension L of approximately 90 mm and a vertical dimension H of approximately 60 mm. In addition, in the frame 141, the plurality of narrow angle lenses 43, the wide angle lens 45, and the plurality of middle angle lenses 47 are formed at different heights with respect to the base 131. Thus, a part of the frame 141 in a side view is formed in a step shape (refer to FIG. 11). The plurality of through holes 39 bored in the base 131 are arranged in accordance with the plurality of narrow angle lenses 43, the wide angle lens 45, and the plurality of middle angle lenses 47 of the condensing lens 111.

In the condensing lens 111, four narrow angle lenses 43 are disposed. An optical axis 53 of each of the four narrow angle lenses 43 is arranged in each corner portion of the quadrangular shape. One wide angle lens 45 is disposed. The optical axis 53 of the wide angle lens 45 is arranged at an intersection 57 of a pair of diagonal lines 55 of the quadrangular shape. Two middle angle lenses 47 are disposed. The optical axes 53 of the two middle angle lenses 47 are linearly arranged in a direction parallel to any one edge of the quadrangular shape with the wide angle lens 45 interposed therebetween.

The condensing lens 111 made of resin is advantageous from the viewpoint of mass production. For example, acrylic-based, epoxy-based, polyester-based, polycarbonate-based, styrene-based, and vinyl chloride-based resins are preferred as the resin. In addition, the properties of the resin can be appropriately selected depending on a manufacturing method such as a photocuring type and a thermoplastic type. For example, a cast molding method using a die, a press molding method, and an injection molding method are practical for the condensing lens 111 made of the resin.

In the case of forming the condensing lens 111 using the die molding method, for example, the condensing lens 111 is manufactured by performing injection molding of thermoplastic resin using a die having a lens shape. In the case of performing more detailed molding for the condensing lens 111, a die is filled with light curable resin or thermoplastic resin, and the resin is pressed. Then, the resin is cured by light or heat, and the resin is peeled from the die. Particularly, in a case where high accuracy is required for the condensing lens 111, it is preferable to use light curable resin that has small thermal expansion and contraction.

The condensing lens 111 may be made of glass. The condensing lens 111 made of glass is advantageous from the point of lifetime and reliability. From an optical viewpoint, for example, it is preferable that a glass material used for the condensing lens 111 is quartz glass, fused silica, or alkali-free glass.

Figure 11:
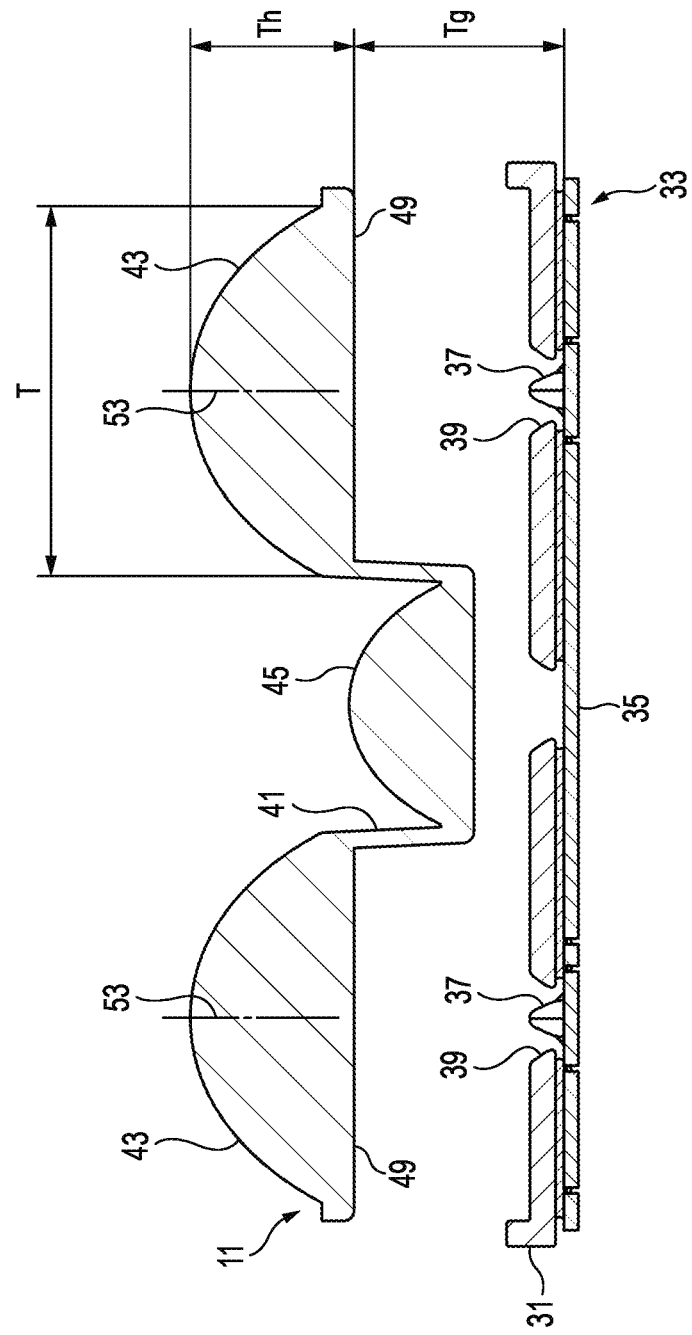
FIG. 11 is an A-A sectional view of FIG. 10.

FIG. 11 is an A-A sectional view of FIG. 10.

Each of the plurality of narrow angle lenses 43 is integrated in the frame 141, and the optical axes 53 of the narrow angle lenses 43 are parallel to each other. More specifically, an outer diameter T of each of the plurality of narrow angle lenses 43 is formed to be equal to 30 to 31 mm. A thickness Th of each of the plurality of narrow angle lenses 43 is formed to be equal to 13 to 14 mm. A plurality of LEDs 37 are arranged on the substrate 35 in correspondence with the positions of the optical axes 53 of the plurality of narrow angle lenses 43. A distance Tg of each of the plurality of narrow angle lenses 43 between each of the plurality of LEDs 37 and a boundary surface 49 on which light from each of the plurality of LEDs 37 is incident is set to 17 to 18 mm. The outer diameter T, the thickness Th, and the distance Tg of each of the plurality of narrow angle lenses 43 are for illustrative purposes and are not limited to the above values.

Figure 12:
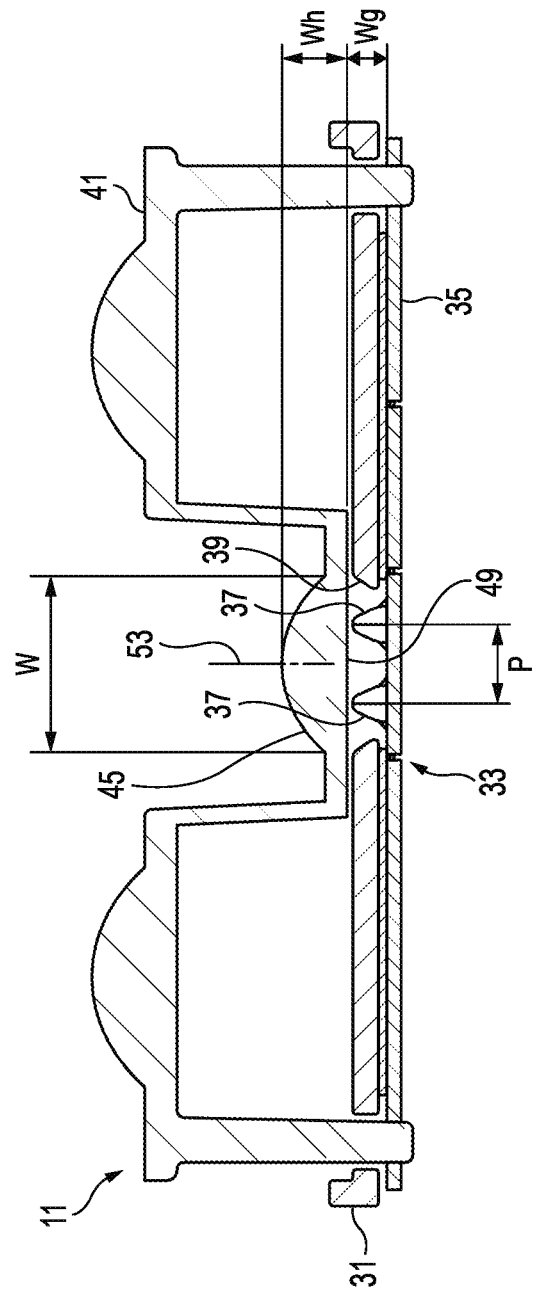
FIG. 12 is a B-B sectional view of FIG. 10.

FIG. 12 is a B-B sectional view of FIG. 10.

The wide angle lens 45 is integrated in the frame 141 while having the optical axis 53 in the same direction as each of the plurality of narrow angle lenses 43. The wide angle lens 45 has a shorter focal length than each of the plurality of narrow angle lenses 43. Each of two LEDs 37 is arranged in correspondence with the position of the optical axis 53 of the wide angle lens 45. A distance Wg of the wide angle lens 45 between each of the two LEDs 37 and the boundary surface 49 on which light from each of the plurality of LEDs 37 is incident is different from the distance Tg of the narrow angle lens 43. More specifically, an outer diameter W of the wide angle lens 45 is formed to be equal to 15 to 16 mm. A thickness Wh of the wide angle lens 45 is formed to be equal to 5 to 6 mm. The distance Wg of the wide angle lens 45 between each of the two LEDs 37 and the boundary surface 49 on which light from each of the two LEDs 37 is incident is set to 3 to 4 mm. Each of the two LEDs 37 is arranged for only the wide angle lens 45. The two LEDs 37 are arranged at a pitch P with the optical axis 53 of the wide angle lens 45 interposed therebetween. The pitch P is set to approximately 7 mm. The outer diameter W, the thickness Wh, the distance Wg, and the pitch P of the wide angle lens 45 are for illustrative purposes and are not limited to the above values.

Figure 13:
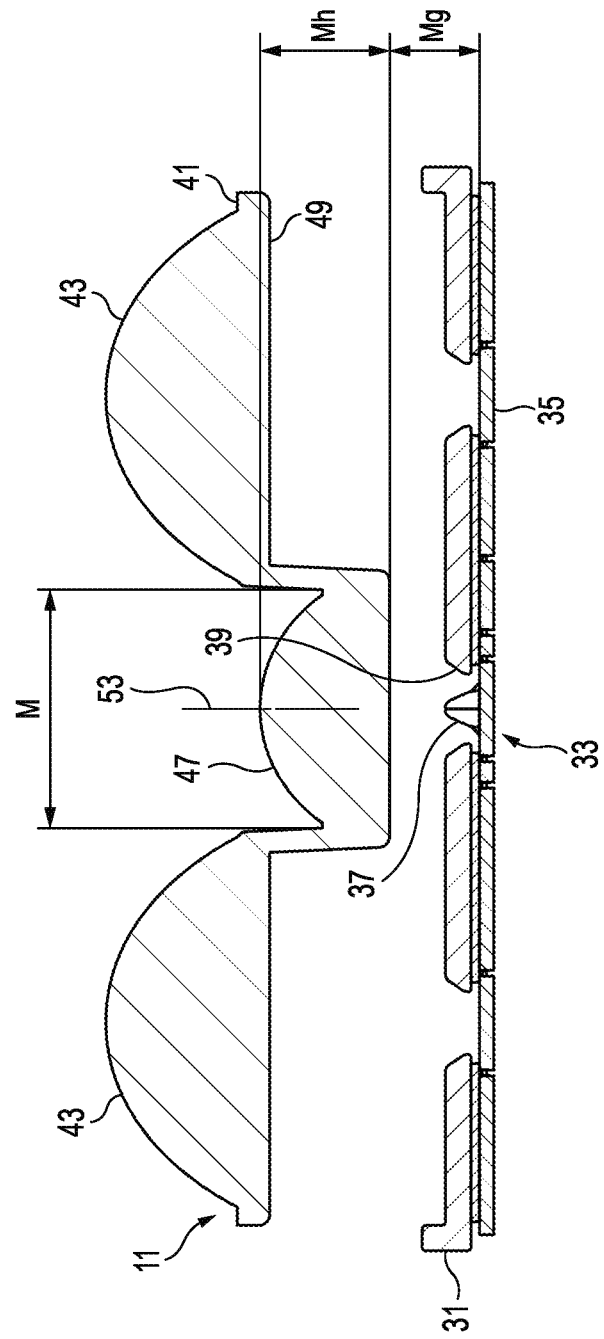
FIG. 13 is a C-C sectional view of FIG. 10.

FIG. 13 is a C-C sectional view of FIG. 10.

Each of the plurality of middle angle lenses 47 is integrated in the frame 141 while having the optical axis 53 in the same direction as each of the plurality of narrow angle lenses 43. Each of the plurality of middle angle lenses 47 has a shorter focal length than each narrow angle lens 43 and has a longer focal length than the wide angle lens 45. A plurality of LEDs 37 are arranged on the substrate 35 in correspondence with the positions of the optical axes 53 of the plurality of middle angle lenses 47. The distance of each of the plurality of middle angle lenses 47 between each of the plurality of LEDs 37 and the boundary surface 49 is different from the distance Tg of each narrow angle lens 43 and the distance Wg of the wide angle lens 45. More specifically, an outer diameter M of each of the plurality of middle angle lenses 47 is formed to be equal to 18 to 19 mm. A thickness Mh of each of the plurality of middle angle lenses 47 is formed to be equal to 10 to 11 mm. A distance Mg of each of the plurality of middle angle lenses 47 between each of the plurality of LEDs 37 and the boundary surface 49 on which light from each of the plurality of LEDs 37 is incident is set to 7 to 8 mm. The outer diameter M, the thickness Mh, the distance Mg, and the pitch P of each of the middle angle lenses 47 are for illustrative purposes and are not limited to the above values.

Accordingly, the distance of the condensing lens 111 from the plurality of LEDs 37 disposed for the wide angle lens 45, each middle angle lens 47, and each narrow angle lens 43 to the boundary surface 49 of each lens is increased in the order of the wide angle lens 45, each middle angle lens 47, and each narrow angle lens 43.

Figure 14:
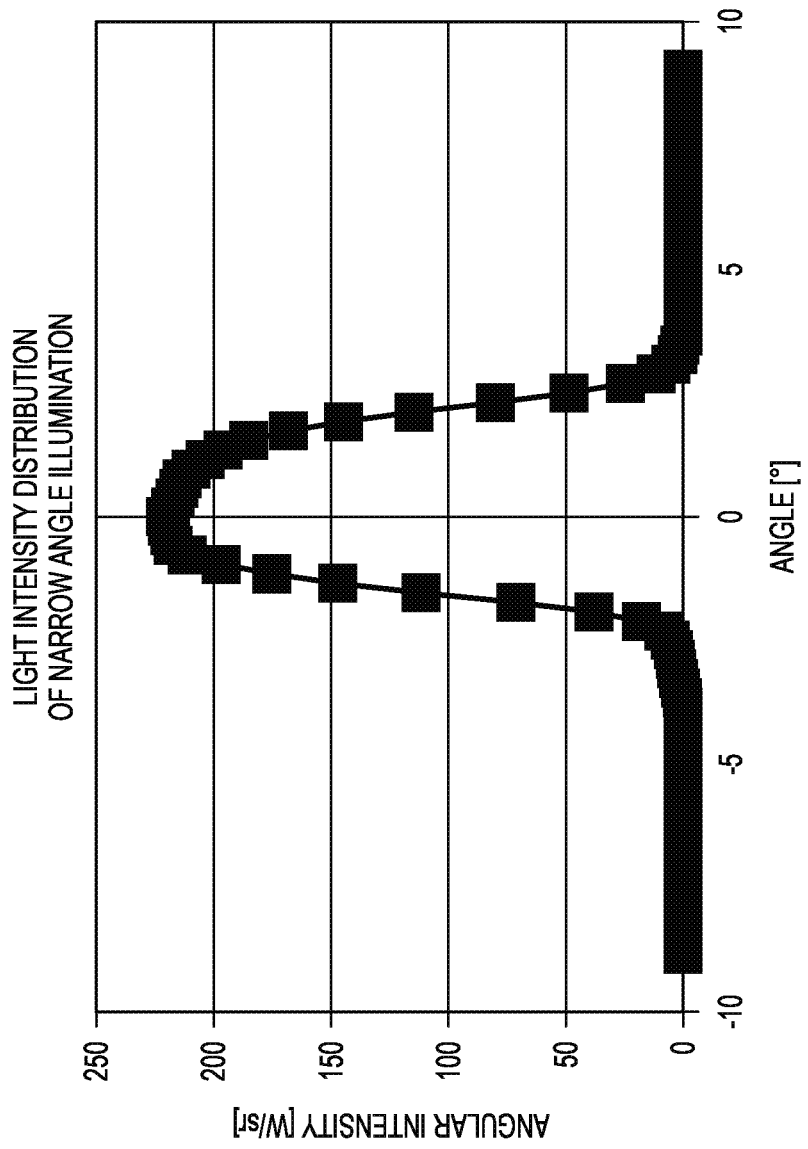
FIG. 14 is a diagram illustrating a correlation example between an angular intensity and an angle of a narrow angle illumination.

FIG. 14 is a diagram illustrating a correlation example between an angular intensity and an angle of a narrow angle illumination. The narrow angle illumination corresponds to each of the plurality of LEDs 37 disposed in correspondence with the plurality of narrow angle lenses 43.

Figure 15:
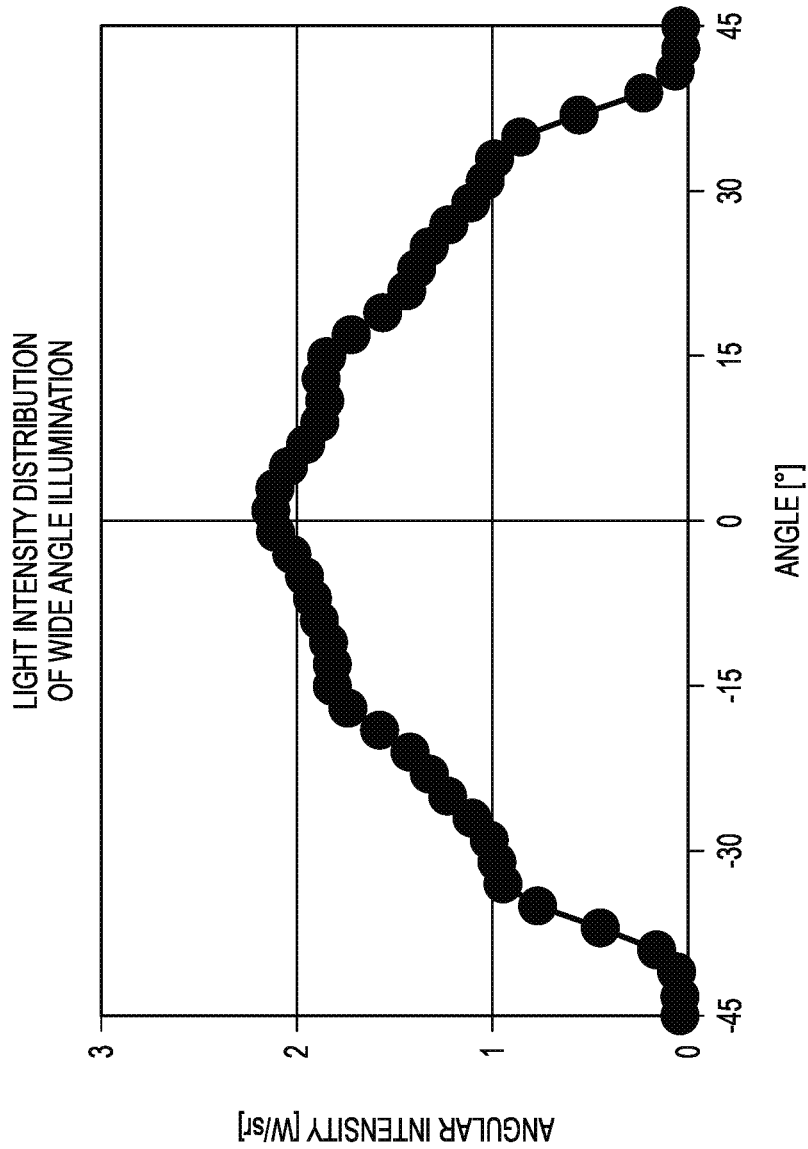
FIG. 15 is a diagram illustrating a correlation example between an angular intensity and an angle of a wide angle illumination.
Figure 16:
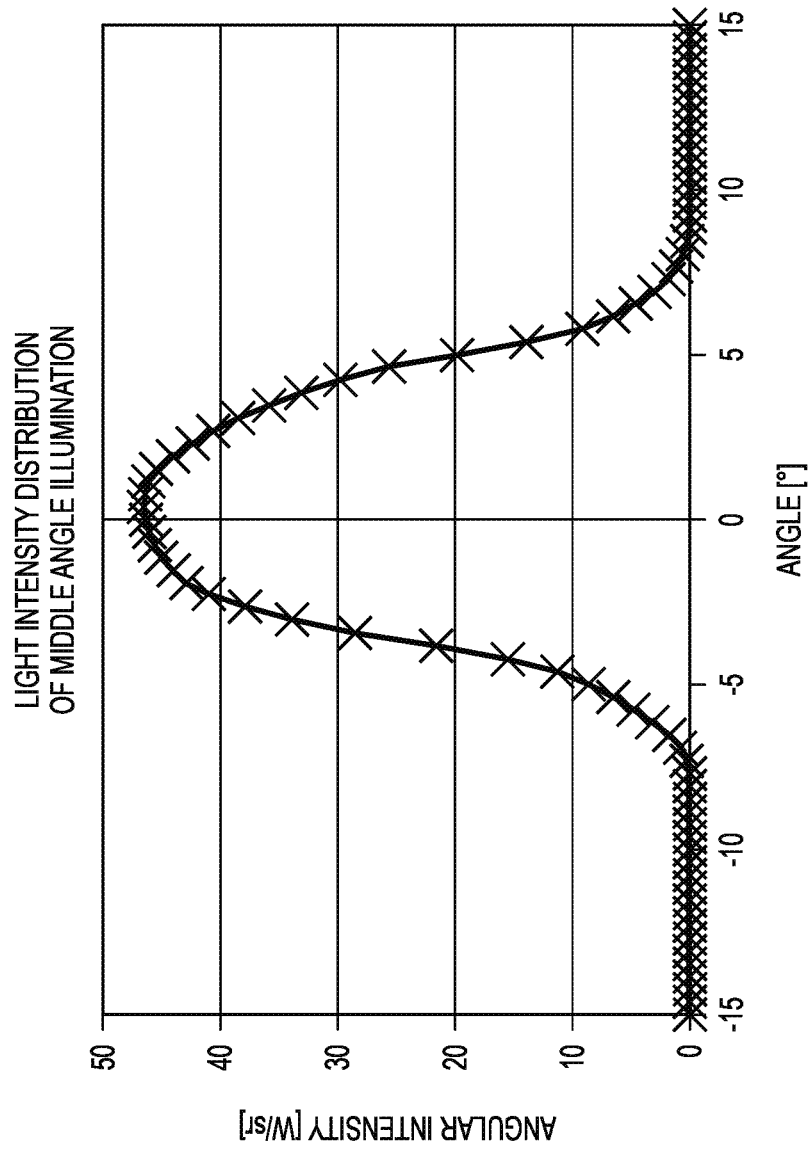
FIG. 16 is a diagram illustrating a correlation example between an angular intensity and an angle of a middle angle illumination.

FIG. 14 to FIG. 16 illustrate results of simulating a light intensity distribution obtained by transmission through each lens in the condensing lens 111 based on the numerical values of the above specific example. In each drawing, the angular intensity on the vertical axis is the light intensity per unit angle. In each drawing, the angle on the horizontal axis is the angle of each of the plurality of LEDs 37 with respect to the optical axis 53 thereof. The intensity of light emitted from all of the plurality of LEDs 37 is the same.

Each of the plurality of narrow angle lenses 43 can irradiate a part (angle) close to the optical axis 53 (that is, 0°) with strong light in a focused manner. Accordingly, each of the plurality of narrow angle lenses 43 can capture a subject that is positioned at a long distance from the monitoring camera 13.

FIG. 15 is a diagram illustrating a correlation example between an angular intensity and an angle of a wide angle illumination. The wide angle illumination corresponds to each of the two LEDs 37 disposed in correspondence with the wide angle lens 45.

The wide angle lens 45 can irradiate a wide part (angle) from the optical axis 53 (that is, 0°) with weaker light than each of the plurality of narrow angle lenses 43. Accordingly, the wide angle lens 45 can capture a subject that is positioned at a short distance from the monitoring camera 13 at a wide angle.

FIG. 16 is a diagram illustrating a correlation example between an angular intensity and an angle of a middle angle illumination. The middle angle illumination corresponds to each of the plurality of LEDs 37 disposed in correspondence with the plurality of middle angle lenses 47.

Each of the plurality of middle angle lenses 47 can irradiate a part that is wider than the part irradiated by each of the plurality of narrow angle lenses 43 and narrower than the part irradiated by the wide angle lens 45 at a light intensity between each narrow angle lens 43 and the wide angle lens 45. Accordingly, each of the plurality of narrow angle lenses 43 can capture a subject that is positioned at a middle distance from the monitoring camera 13.

Figure 17:
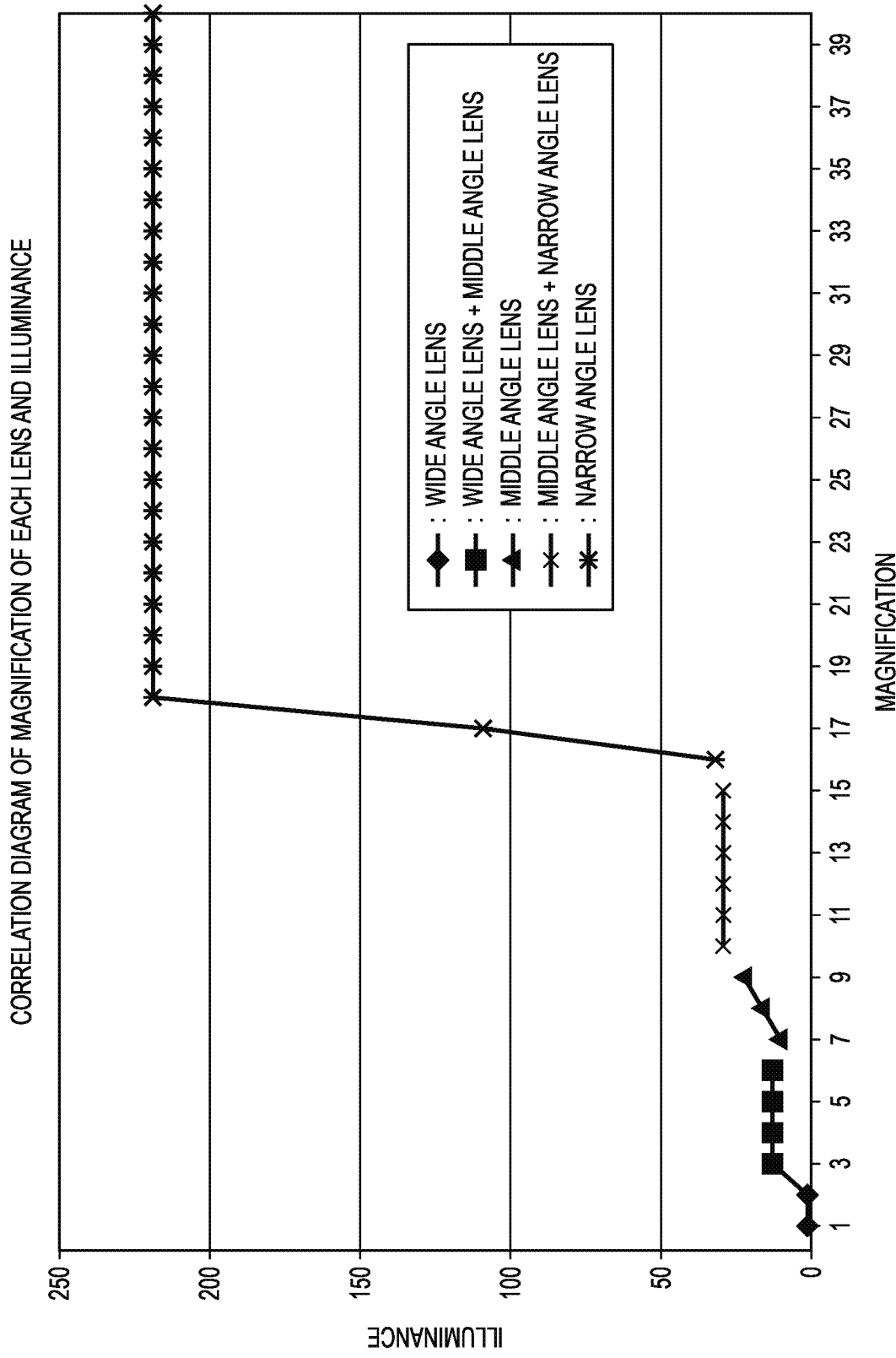
FIG. 17 is a diagram illustrating a correlation example between a magnification of each lens and an illuminance.

FIG. 17 is a diagram illustrating a correlation example between the magnification of each lens and an illuminance.

For example, the wide angle lens 45 is applied to an illumination having a zoom magnification of approximately 1 to 2. For example, the use of the wide angle lens 45 and each of the plurality of middle angle lenses 47 together is applied to an illumination having a zoom magnification of approximately 3 to 6. For example, each of the plurality of middle angle lenses 47 is applied to an illumination having a zoom magnification of approximately 7 to 9. For example, the use of each of the plurality of middle angle lens 47 and each of the plurality of narrow angle lenses 43 together is applied to an illumination having a zoom magnification of approximately 10 to 15. For example, each of the plurality of narrow angle lenses 43 is applied to an illumination having a zoom magnification of approximately 17 to 40.

Next, the effect of the configuration according to Embodiment 2 will be described.

The condensing lens 111 according to Embodiment 2 includes the frame 141, the plurality of narrow angle lenses 43 that are integrated in the frame 141 and have the optical axes 53 parallel to each other, one wide angle lens 45 that has the optical axis 53 in the same direction as each narrow angle lens 43, is integrated in the frame 141, has a shorter focal length than each narrow angle lens 43, and has a different distance between the light source and the boundary surface 49 on which light from the light source is incident from each narrow angle lens 43, and the plurality of middle angle lenses 47 that have the optical axes 53 in the same direction as each narrow angle lens 43, are integrated in the frame 141, have a shorter focal length than each narrow angle lens 43 and a longer focal length than the wide angle lens 45, and have a different distance between the light source and the boundary surface 49 from each narrow angle lens 43 and the wide angle lens 45.

In the condensing lens 111 according to Embodiment 2, each narrow angle lens 43, the wide angle lens 45, and each middle angle lens 47 are integrated through the frame 141. Accordingly, in the condensing lens 111, irradiation of an illumination in a capturing range of a few meters ahead using the wide angle lens 45, irradiation of an illumination in a capturing range of approximately 350 m ahead using each narrow angle lens 43, and irradiation of an illumination in a capturing range of an intermediate distance using each middle angle lens 47 can be implemented by a plurality of lenses configured as a single unit. Consequently, the condensing lens 111 can improve the nighttime visibility of the monitoring camera 13.

The condensing lens 111 can be manufactured using the die molding method. Thus, the condensing lens 111 is advantageous in productivity and can be inexpensively manufactured.

For example, in the condensing lens 111 manufactured using the die molding method, each of a plurality of lenses having different focal lengths can be arranged at a predetermined position with high accuracy. Accordingly, a positional deviation from the light source can be reduced, and a high quality illuminance distribution not having unevenness can be obtained.

In addition, in the condensing lens 111, each lens is integrated in the frame 141. Thus, a plurality of types of lenses can be fixed in the light source unit 33 at once through the frame 141. Accordingly, in the condensing lens 111, a member and a space for individually arranging and holding each of the plurality of types of lenses can be removed, and component cost can be decreased.

In addition, since the number of components is small, assembly work is facilitated, and assembly work cost can be decreased.

Furthermore, since fixing components can be removed and a lens fixing mechanism can be simplified, the size of the whole illumination device is decreased.

In the condensing lens 111, since the fixing mechanism can be simplified by decreasing the number of components, weight can be decreased (weight reduction). The lightweight condensing lens 111 can reduce the weight of the illumination device 121. In a case where the illumination device 121 in which the condensing lens 111 is used is mounted in the PTZ type monitoring camera 13, the illumination device 121 is supported by the tilt rotation mechanism 25 along with the camera unit 19. Furthermore, the tilt rotation mechanism 25 is supported by the pan rotation mechanism 123. That is, the tilt rotation mechanism 25 and the pan rotation mechanism 123 constitute the multistage rotation drive mechanism in which the pan rotation mechanism 123 is the initial state on the fixing side. Accordingly, the condensing lens 111 can reduce the weight of the multistage rotation drive mechanism on a drive tip end side. Accordingly, the size of the tilt rotation mechanism 25 can be reduce, and finally, the size of the pan rotation mechanism 123 can be reduced. Consequently, a decrease in size and a decrease in power of the whole monitoring camera 13 can be implemented.

In addition, in the condensing lens 111, the distance from each of the plurality of LEDs 37 disposed in the light source unit 33 to the boundary surface 49 of each lens is increased in the order of the wide angle lens 45, each middle angle lens 47, and each narrow angle lens 43.

In the condensing lens 111, the focal length is increased in the order of the wide angle lens 45, each middle angle lens 47, and each narrow angle lens 43. As the focal length of the lens is increased, light from the light source can be narrowed (the part close to the optical axis 53 is irradiated in a focused manner). In other words, the plurality of LEDs 37 disposed in the light source unit 33 in correspondence with the lenses can be arranged in the same flat surface by changing the position of the boundary surface 49 of the corresponding lenses. Accordingly, in the condensing lens 111, by changing the distance from each of the plurality of LEDs 37 disposed in the light source unit 33 to the boundary surface 49 of each lens, the plurality of LEDs 37 disposed in each of a plurality of light source units 33 can be mounted at once in the same flat surface of one substrate 35. Accordingly, the condensing lens 111 enables the light source unit 33 to be simply configured.

In addition, in the condensing lens 111, the optical axis 53 of each of the four narrow angle lenses 43 is arranged in each corner portion of the quadrangular shape. The optical axis 53 of the wide angle lens 45 is arranged at the intersection 57 of the pair of diagonal lines 55 of the quadrangular shape. The optical axes 53 of the two middle angle lenses 47 are linearly arranged in a direction parallel to any one edge of the quadrangular shape with the wide angle lens 45 interposed therebetween.

In the condensing lens 111, each of the four narrow angle lenses 43 that achieve strong light by decreasing the irradiation angle is used in the irradiation of the illumination in the capturing range of approximately 350 m ahead. Each of the four narrow angle lenses 43 illuminates a far capturing range in a focused manner. Thus, the optical axes 53 of the four narrow angle lenses 43 are radially disposed about the center of the capturing range. This radial arrangement is implemented by arranging the optical axis 53 of each lens in each corner portion of the quadrangular shape. In the condensing lens 111, the exterior shape of the frame 141 can be formed in a simple quadrangular shape by arranging each of the four narrow angle lenses 43 on the outermost periphery. Each of the four narrow angle lenses 43 has a small irradiation angle. Thus, even in a case where each of the four narrow angle lenses 43 is arranged on the outermost periphery of the condensing lens 111, an advantage is achieved such that vignetting caused by a surrounding member is unlikely to occur.

In the irradiation of the illumination in the close capturing range, one wide angle lens 45 for which relatively weak light may be used by increasing the irradiation angle is used. Thus, the optical axis 53 of the wide angle lens 45 is arranged at the intersection 57 of the pair of diagonal lines 55 of the quadrangular shape. That is, the wide angle lens 45 is arranged at the center of the frame 141 of the quadrangular shape. By arranging the wide angle lens 45 having a large irradiation angle at the center of the condensing lens 111, the wide angle lens 45 can be arranged at a position at which vignetting caused by the surrounding member is most unlikely to occur among the plurality of lenses.

Each of the two middle angle lenses 47 is arranged in a redundant space of the frame 141 of the quadrangular shape in which the four narrow angle lenses 43 and one wide angle lens 45 are arranged in the corner portions and the center. That is, the optical axes 53 of the two middle angle lenses 47 are linearly arranged in a direction parallel to any one edge of the quadrangular shape with the wide angle lens 45 interposed therebetween. Accordingly, the frame 141 of the quadrangular shape has a rectangular (oblong) shape in which one edge along which the two middle angle lenses 47 are arranged is a short edge.

In addition, in the condensing lens 111, by arranging each narrow angle lens 43, the wide angle lens 45, and each middle angle lens 47 at such appropriate locations, irradiation of an illumination that is unlikely to cause unevenness (such as vignetting) can be performed while implementing high density lens arrangement.

The monitoring camera 13 according to Embodiment 2 includes the condensing lens 111 including the frame 141, each of the plurality of narrow angle lenses 43 that are integrated in the frame 141 and have the optical axes 53 parallel to each other, one wide angle lens 45 that has the optical axis 53 in the same direction as each of the plurality of narrow angle lenses 43, is integrated in the frame 141, has a shorter focal length than each of the plurality of narrow angle lenses 43, and has a different distance between the light source and the boundary surface 49 on which light from the light source is incident from each of the plurality of narrow angle lenses 43, and the plurality of middle angle lenses 47 that have the optical axes 53 in the same direction as each of the plurality of narrow angle lenses 43, are integrated in the frame 141, have a shorter focal length than each of the plurality of narrow angle lenses 43 and a longer focal length than the wide angle lens 45, and have a different distance between the light source and the boundary surface 49 from each of the plurality of narrow angle lenses 43 and the wide angle lens 45; and the light source unit 33 in which the plurality of LEDs 37 that are arranged in at least one-to-one correspondence with each of the narrow angle lenses 43, the wide angle lens 45, and the middle angle lenses 47 are mounted on the same substrate 35.

In the monitoring camera 13 according to Embodiment 2, each narrow angle lens 43, the wide angle lens 45, and each middle angle lens 47 are formed in the condensing lens 111 as a single unit, and the plurality of LEDs 37 corresponding to each lens are mounted on one substrate 35 of the light source unit 33. The condensing lens 111 and the light source unit 33 constitute the illumination device 121. The LEDs 37 can be positioned at once with respect to each lens with high accuracy in the illumination device 121 compared to a structure of individually positioning each of the plurality of LEDs 37 formed as a single unit for each of a plurality of lenses that are formed as a single unit and have different focal lengths. Accordingly, a positional deviation from the light source can be reduced, and a high quality illuminance distribution not having unevenness can be obtained. In addition, the number of components can be decreased, and the assembly work can be facilitated. Thus, product cost can be decreased. In addition, the size of the illumination device 121 configured with a plurality of lenses and a plurality of light sources can be decreased. Furthermore, the weight of the illumination device 121 can be reduced.

Embodiment 3

Next, a condensing lens 59 according to Embodiment 3 will be described.

Figure 18:
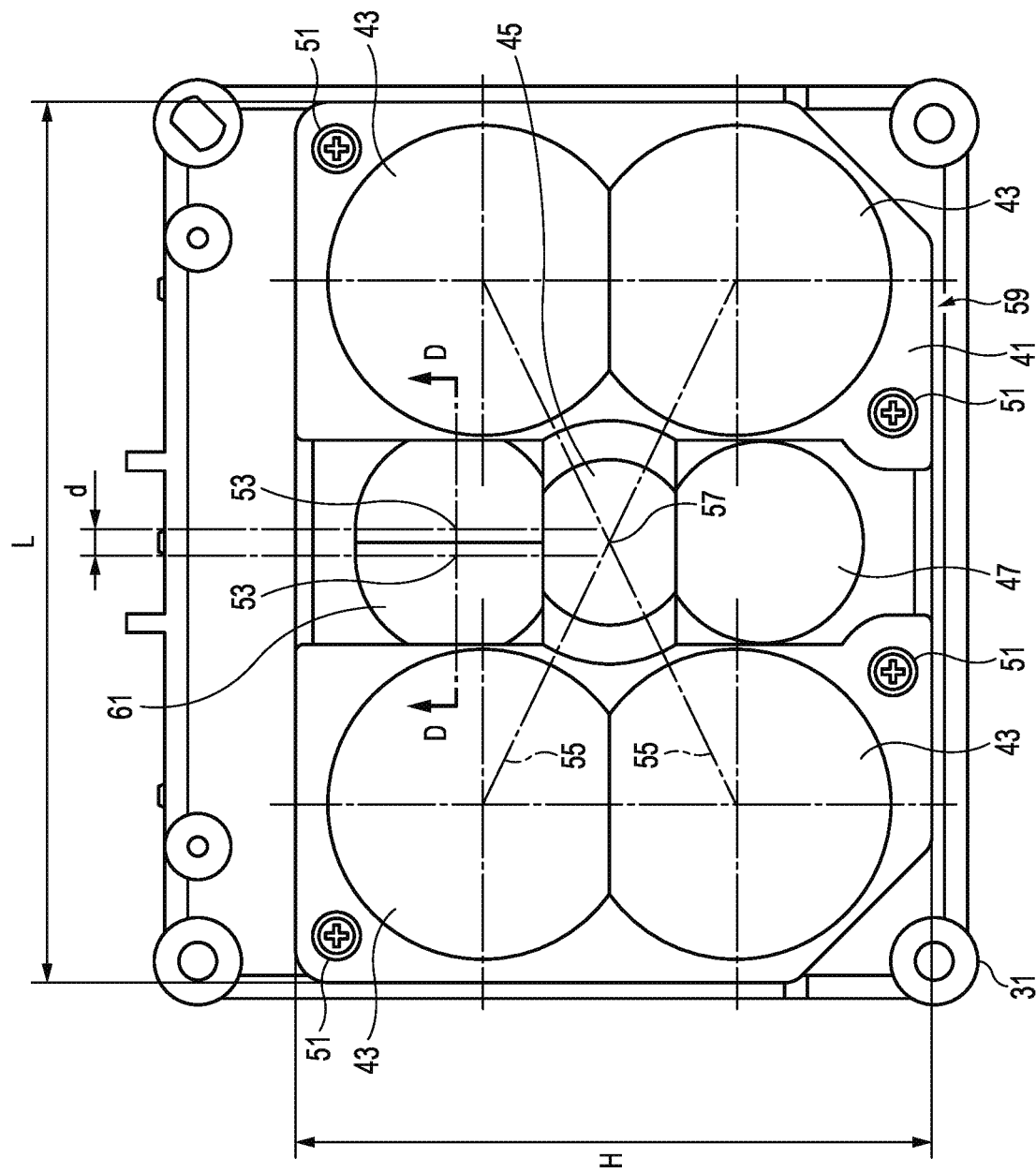
FIG. 18 is a front view of one example of a condensing lens according to Embodiment 3.

FIG. 18 is a front view of one example of the condensing lens 59 according to Embodiment 3.

In Embodiment 3, the same configurations as the configurations illustrated in Embodiment 2 will be designated by the same reference signs, and duplicate descriptions of such configurations will be omitted.

In the condensing lens 59 according to Embodiment 3, one middle angle lens of two middle angle lenses 47 is formed in a shape in which two lenses having the same shape as the other middle angle lens 47 are overlaid by deviating the optical axes 53 of the lenses in a direction perpendicular to the one edge. A deviation dimension d is set to approximately 2.4 mm.

Figure 19:
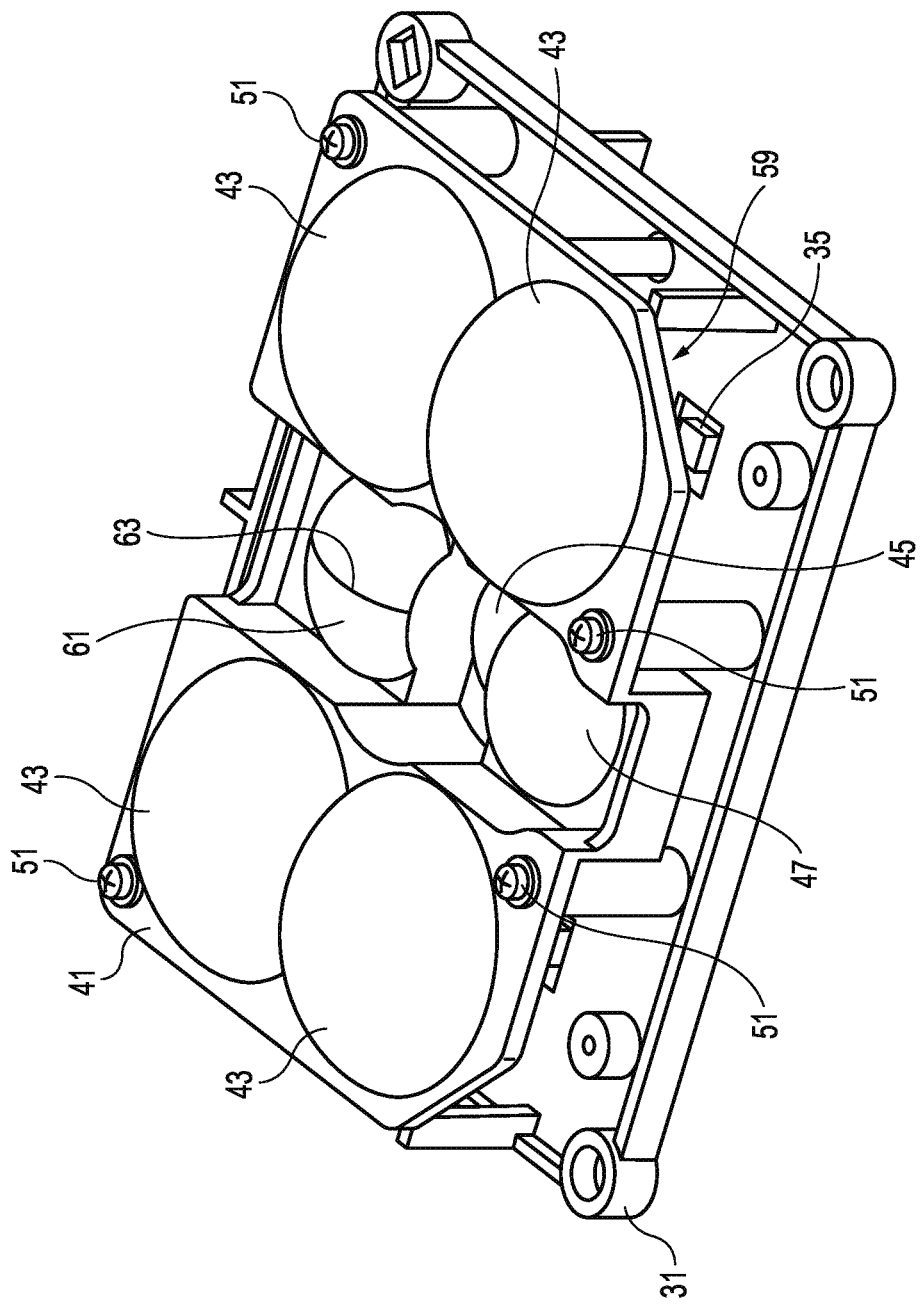
FIG. 19 is a perspective view of one example of the condensing lens illustrated in FIG. 18.

FIG. 19 is a perspective view of one example of the condensing lens 59 illustrated in FIG. 18.

The middle angle lens in which two lenses are overlaid in a deviating manner will be referred to as a dual middle angle lens 161. The dual middle angle lens 161 has two apex portions of spherical surfaces. In the dual middle angle lens 161, a groove portion 63 in a direction along the one edge is between the two apex portions.

Figure 20:
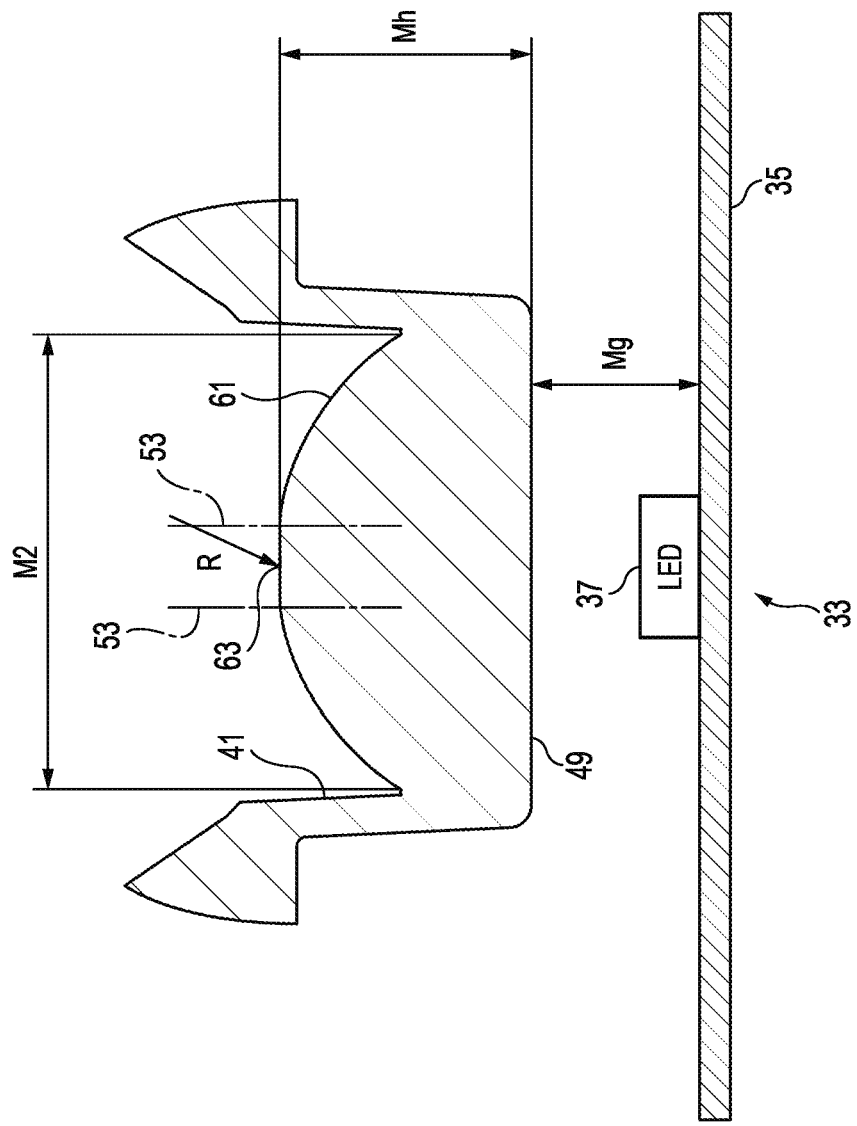
FIG. 20 is a D-D sectional view of FIG. 18.

FIG. 20 is a D-D sectional view of FIG. 18.

A section of the groove portion 63 orthogonal to a groove extending direction is a very small curved surface R. More specifically, the curved surface R is 0.2 mm. A long diameter M2 of the dual middle angle lens 161 is formed to be equal to 19 to 20 mm. A thickness Mh of the dual middle angle lens 161 is formed to be equal to 10 to 11 mm. A distance Mg of the dual middle angle lens 161 between the LED 37 and the boundary surface 49 on which light from the LED 37 is incident is set to 7 to 8 mm. Other configurations are the same as Embodiment 2. The curved surface R, the long diameter M2, the thickness Mh, and the distance Mg of the groove portion 63 included in the dual middle angle lens 161 are not limited to the above values and may be values from which a light intensity distribution enabling irradiation of a wider part (angle) than the light intensity distribution of the middle angle illumination illustrated in FIG. 16 is obtained like a middle angle illumination illustrated in FIG. 21 described below.

Figure 21:
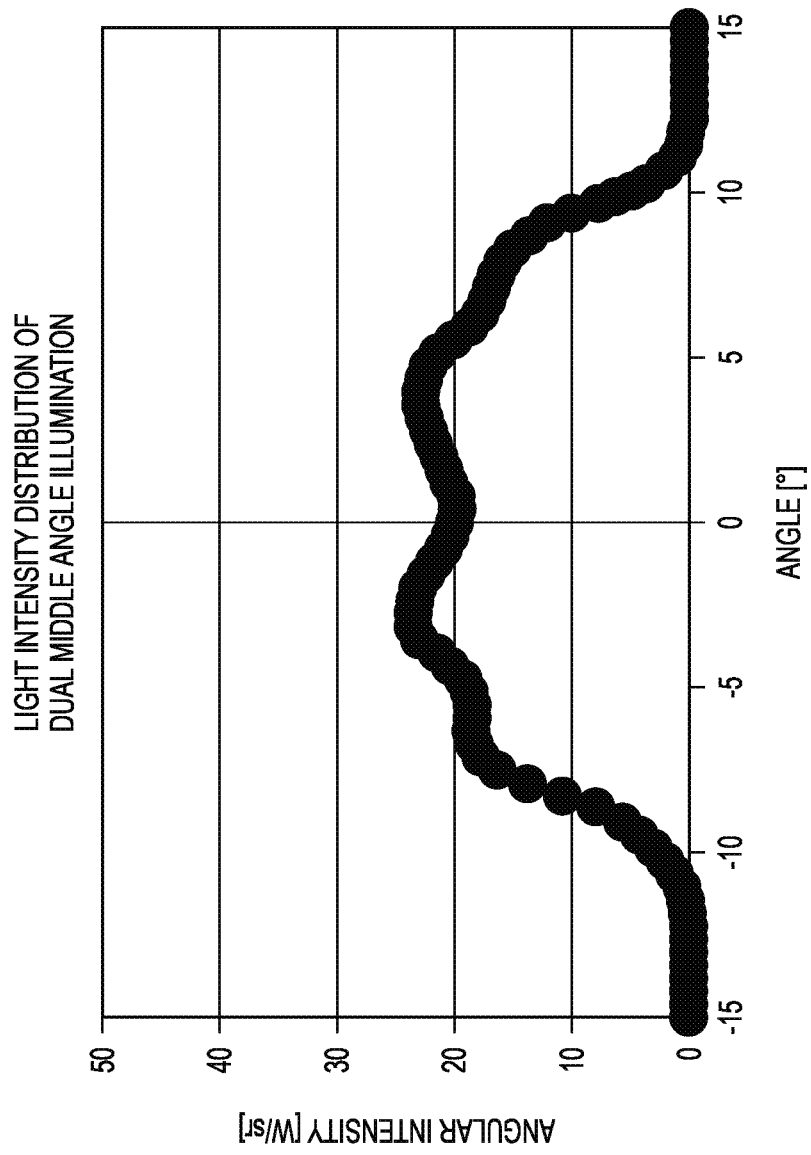
FIG. 21 is a diagram illustrating a correlation example between an angular intensity and an angle of a middle angle illumination including a dual middle angle lens.

FIG. 21 is a diagram illustrating a correlation example between the angular intensity and the angle of the middle angle illumination including the dual middle angle lens 161.

The dual middle angle lens 161 can irradiate a part that is wider than the part irradiated by each of the plurality of narrow angle lenses 43 and narrower than the part irradiated by the wide angle lens 45 at a light intensity between each of the plurality of narrow angle lenses 43 and the wide angle lens 45. In addition, the dual middle angle lens 161 can irradiate a part that corresponds to the separation between the two optical axes 53 and is wider than the part irradiated by the middle angle lens 47 illustrated in FIG. 16.

Next, the effect of the configuration according to Embodiment 3 will be described.

In the condensing lens 59, one middle angle lens 47 of the two middle angle lenses 47 is formed in a shape in which two lenses having the same shape as the other middle angle lens 47 are overlaid by deviating the optical axes 53 of the lenses in a direction perpendicular to the one edge.

In the condensing lens 59, one middle angle lens 47 of the two middle angle lenses 47 is configured with two lenses having the same shape as the other middle angle lens 47. These two lenses are formed in a shape in which the two lenses are overlaid with the optical axes 53 deviating in a direction perpendicular to the one edge. By separately arranging the two lenses from each other, the dual middle angle lens 161 can spread the illuminance distribution to the angle of view of the horizontally long rectangular shape by overlaying a condensed illumination by changing the angle.

In a case where both of the two middle angle lenses 47 are formed as the dual middle angle lens 161, two locations in the part close to the optical axis 53 of each of the two lenses are irradiated with strong focused light of the illumination. The illuminance between the two locations is decreased, and unevenness occurs in the video. Therefore, in the condensing lens 59, only one of the two middle angle lenses 47 is formed as the dual middle angle lens 161. Accordingly, the condensing lens 59 reduces a decrease in illuminance between the two locations irradiated with strong light and does not cause unevenness in brightness in the video.

In addition, the dual middle angle lens 161 can spread light distribution of the illumination transmitted through the dual middle angle lens 161 in a separation direction by an amount corresponding to the separation between the optical axes 53.

The monitoring camera 13 according to Embodiment 3 includes the camera unit 19 that captures a subject irradiated with illumination light from the light source unit 33 through the condensing lens 59, the pan rotation mechanism 123 that turns the capturing direction of the camera unit 19, the tilt rotation mechanism 25 that rotates the camera unit 19 held in the pan rotation mechanism 123 about the center of the tilt rotation orthogonal to the center of the turning, and the zoom mechanism that changes the angle of view of the camera unit 19.

The monitoring camera 13 according to Embodiment 3 has the same configuration as the monitoring camera 13 except the condensing lens 59. Thus, an illustration of the monitoring camera 13 is omitted.

In the monitoring camera 13, the camera unit 19 is supported by the pan rotation mechanism 123 such that the camera unit 19 can be rotationally driven about the vertical axis. The camera unit 19 is supported by the tilt rotation mechanism 25 such that the camera unit 19 can be rotationally driven about the horizontal axis. In addition, the focal length can be changed by the zoom mechanism. That is, the monitoring camera 13 is the PTZ type.

In the condensing lens 59 included in the monitoring camera 13, only one of the two middle angle lenses 47 is formed as the dual middle angle lens 161.

The dual middle angle lens 161 irradiates two locations in the part close to the optical axis 53 of each of the two lenses with strong focused light of the illumination. That is, the dual middle angle lens 161 can spread the light distribution of the illumination in the separation direction by an amount corresponding to the separation of the optical axes 53.

In the monitoring camera 13 in which the condensing lens 59 is used is arranged, the dual middle angle lens 161 is arranged on the upper side in the vertical direction. In a case where the monitoring camera 13 is the PTZ type of which the upper portion is fixed, the monitoring camera 13 can capture the space immediately below the monitoring camera 13. However, in the capturing of the space immediately above the monitoring camera 13, the fixing base 17 in the upper portion is shown in the video. Thus, the rotation base unit 27 includes the vertically long opening portion 29 such that the tilt rotation in the upward direction can be secured as far as possible. In this case, in a configuration in which the condensing lens 59 is disposed on the upper side of the camera unit 19, the condensing lens 59 interferes with the upper end of the opening portion 29 before the camera unit 19 does at the time of the tilt rotation to the upper side. That is, a part of the illumination on the upper side may be subjected to vignetting and a decrease in illuminance due to the upper end of the opening portion 29.

Therefore, in the condensing lens 59, the middle angle lens 47 on the upper side is formed as the dual middle angle lens 161. By spreading the light distribution of the illumination in the separation direction of the two lenses, the dual middle angle lens 161 achieves a video that is bright in the horizontal direction. Accordingly, at the time of an angle of elevation of the monitoring camera 13, the condensing lens 59 reduces an unnaturally dark video (unevenness occurs in the video) even in a case where the illumination is subjected to vignetting at the upper end of the opening portion 29.

Therefore, in the condensing lens 59 according to Embodiment 3, a plurality of lenses having different focal lengths can be inexpensively arranged with high accuracy, and irradiation of the illumination can be performed without unevenness from a close subject to a far subject.

In the monitoring camera 13 according to Embodiment 3, not only a plurality of lenses having different focal lengths can be inexpensively arranged with high accuracy, and irradiation of the illumination can be performed without unevenness from a close subject to a far subject, but also a decrease in size and a decrease in power of the whole monitoring camera 13 can be implemented.

While the embodiments are described thus far with reference to the appended drawings, the present disclosure is not limited to such examples. It is apparent that those skilled in the art may perceive various modification examples, correction examples, replacement examples, deletion examples, and equivalent examples within the scope disclosed in the claims. Those examples are also considered as falling in the technical scope of the present disclosure. In addition, each constituent in the embodiments may be combined in any manner without departing from the gist of the invention.

In addition, the present disclosure may provide a condensing lens including a frame, a plurality of narrow angle lenses that are integrated in the frame and have optical axes parallel to each other, one wide angle lens that has an optical axis in the same direction as the narrow angle lenses, is integrated in the frame, has a shorter focal length than the narrow angle lenses, and has a different distance between a light source and a boundary surface on which light from the light source is incident from the narrow angle lenses, and a plurality of middle angle lenses that have optical axes in the same direction as the narrow angle lenses, are integrated in the frame, have a shorter focal length than the narrow angle lenses and a longer focal length than the wide angle lens, and have a different distance between the light source and the boundary surface from the narrow angle lenses and the wide angle lens as a first condensing lens.

In addition, in the first condensing lens, the present disclosure may provide a condensing lens of which the distance between the light source and the boundary surface is increased in an order of the wide angle lens, the middle angle lenses, and the narrow angle lenses as a second condensing lens.

In addition, in the first or second condensing lens, the present disclosure may provide a condensing lens in which the optical axis of each of four narrow angle lenses is arranged in each corner portion of a quadrangular shape, the optical axis of the wide angle lens is arranged at an intersection of a pair of diagonal lines of the quadrangular shape, and the optical axes of two middle angle lenses are linearly arranged in a direction parallel to any one edge of the quadrangular shape with the wide angle lens interposed between the optical axes as a third condensing lens.

In addition, in the third condensing lens, the present disclosure may provide a condensing lens in which one middle angle lens of the two middle angle lenses is formed in a shape in which two lenses having the same shape as the other middle angle lens are overlaid by deviating optical axes of the lenses in a direction perpendicular to the one edge as a fourth condensing lens.

In addition, the present disclosure may provide a first monitoring camera including a condensing lens including a frame, a plurality of narrow angle lenses that are integrated in the frame and have optical axes parallel to each other, one wide angle lens that has an optical axis in the same direction as the narrow angle lenses, is integrated in the frame, has a shorter focal length than the narrow angle lenses, and has a different distance between a light source and a boundary surface on which light from the light source is incident from the narrow angle lenses, and a plurality of middle angle lenses that have optical axes in the same direction as the narrow angle lenses, are integrated in the frame, have a shorter focal length than the narrow angle lenses and a longer focal length than the wide angle lens, and have a different distance between the light source and the boundary surface from the narrow angle lenses and the wide angle lens; and a light source unit in which each of a plurality of LEDs that are arranged in at least one-to-one correspondence with each of the narrow angle lenses, the wide angle lens, and the middle angle lenses is mounted on the same substrate.

In addition, in the first monitoring camera, the present disclosure may provide a monitoring camera including a camera unit that captures a subject irradiated with illumination light from the light source unit through the condensing lens, a pan rotation mechanism that turns a capturing direction of the camera unit, a tilt rotation mechanism that rotates the camera unit held in the pan rotation mechanism about the center of a tilt rotation orthogonal to the center of the turning, and a zoom mechanism that changes an angle of view of the camera unit as a second monitoring camera.

The present disclosure is effective as a camera device and an IR light irradiating method for adaptively reducing degradation of an image quality of a captured image and improving visibility of the captured image by simple control depending on a zoom process at a time of capturing a capturing target scene.

The present application is based upon Japanese Patent Application (Patent Application No. 2019-007061 filed on Jan. 18, 2019 and Patent Application No. 2019-092389 filed on May 15, 2019), the contents of which are incorporated herein by reference.

What is claimed is:

1. A condensing lens comprising:
a frame that is formed in an approximately quadrangular shape in a plan view;
four narrow angle lenses that are integrated in the frame, have optical axes parallel to each other, and are disposed at four corner portions of the frame respectively;
a wide angle lens that has an optical axis in a same direction as optical axes of the narrow angle lenses, is integrated in the frame, has a focal length shorter than focal lengths of the narrow angle lenses, and is disposed at an intersection of two diagonal lines extended from the four corner portions of the frame; and
two middle angle lenses that have optical axes in the same direction as the optical axes of the narrow angle lenses, are integrated in the frame, have a focal length shorter than the focal lengths of the narrow angle lenses and longer than a length of the wide angle lens, and are surrounded by both the wide angle lens and the two narrow angle lenses which are arranged along with each of two longitudinal sides of the approximately quadrangular shape of the frame extending in a longitudinal direction.

2. The condensing lens according to claim 1,
wherein one middle angle lens of the two middle angle lenses has two apex portions arranged along with the longitudinal direction and has a groove portion having a predetermined curvature, the groove portion being arranged between the two apex portions and being extended along with a direction perpendicular to the longitudinal direction in a plan view.

3. A camera comprising:
the condensing lens according to claim 1; and
a light source unit having a plurality of LEDs,
wherein one LED of the plurality of LEDs is mounted on a substrate so as to correspond to each of the four narrow angle lenses, two LEDs of the plurality of LEDs are mounted on the substrate so as to correspond to the wide angle lens, and one LED of the plurality of LEDs is mounted on the substrate so as to correspond to each of the two middle angle lenses.

4. The camera according to claim 3, further comprising:
a camera unit configured to capture a subject irradiated with illumination light from the light source unit through the condensing lens;
a pan rotation mechanism that turns a capturing direction of the camera unit;
a tilt rotation mechanism that rotates the camera unit held on the pan rotation mechanism around a center of a tilt rotation orthogonal to a center of a tuning of the capturing direction; and
a zoom mechanism that changes an angle of view of the camera unit.

5. A camera comprising:
the condensing lens according to claim 2; and
a light source unit having a plurality of LEDs,
wherein one LED of the plurality of LEDs is mounted on a substrate so as to correspond to each of the four narrow angle lenses, two LEDs of the plurality of LEDs are mounted on the substrate so as to correspond to the wide angle lens, and one LED of the plurality of LEDs is mounted on the substrate so as to correspond to each of the two middle angle lenses.

6. The camera according to claim 5, further comprising:

a camera unit configured to capture a subject irradiated with illumination light from the light source unit through the condensing lens;

a pan rotation mechanism that turns a capturing direction of the camera unit;

a tilt rotation mechanism that rotates the camera unit held on the pan rotation mechanism around a center of a tilt rotation orthogonal to a center of a tuning of the capturing direction; and a zoom mechanism that changes an angle of view of the camera unit.

* * * * *